(12) United States Patent
Nambara

(10) Patent No.: US 10,920,958 B2
(45) Date of Patent: Feb. 16, 2021

(54) HEAD-UP DISPLAY DEVICE

(71) Applicant: DENSO CORPORATION, Kariya (JP)

(72) Inventor: Takahiro Nambara, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 16/078,076

(22) PCT Filed: Jan. 13, 2017

(86) PCT No.: PCT/JP2017/000941
§ 371 (c)(1),
(2) Date: Aug. 21, 2018

(87) PCT Pub. No.: WO2017/145557
PCT Pub. Date: Aug. 31, 2017

(65) Prior Publication Data
US 2019/0056086 A1 Feb. 21, 2019

(30) Foreign Application Priority Data

Feb. 23, 2016 (JP) ................................ 2016-032258
Apr. 13, 2016 (JP) ................................ 2016-080580

(51) Int. Cl.
*F21V 5/04* (2006.01)
*B60K 35/00* (2006.01)
(Continued)

(52) U.S. Cl.
CPC .............. *F21V 5/045* (2013.01); *B60K 35/00* (2013.01); *G02B 3/0056* (2013.01); *G02B 3/08* (2013.01);
(Continued)

(58) Field of Classification Search
CPC .... G02B 27/01–0101; G02B 2027/0105–0147
See application file for complete search history.

(56) References Cited

U.S. PATENT DOCUMENTS 6,490,086 B2 * 12/2002 Morishima ........ G02B 27/0172
359/443
7,410,264 B2 * 8/2008 Yamasaki .......... G02B 27/0911
348/801
(Continued)

FOREIGN PATENT DOCUMENTS

CN 101990614 A 3/2011
CN 104508546 A 4/2015
(Continued)

OTHER PUBLICATIONS

U.S. Appl. No. 16/078,093, filed Aug. 21, 2018, Nambara.

*Primary Examiner* — Christopher Stanford
(74) *Attorney, Agent, or Firm* — Harness, Dickey & Pierce, P.L.C.

(57) ABSTRACT

An illumination light from each light emitting device illuminates a corresponding region of an image forming unit to form an image. A light condensing unit has multiple lens elements paired with the respective light emitting devices. Each condenser lens element has a light condensing surface to condense the illumination light. A z-direction is a direction connecting a surface vertex of the light condensing surface with the light emitting device paired with the surface vertex. An x-direction and a y-direction are orthogonal to each other on a virtual plane orthogonal to the z-direction. The pair of the condenser lens element and the light emitting device is aligned in at least one of the x-direction and the y-direction. Each light condensing surface is formed in a convex shape in which a curvature in the x-direction and a curvature in the y-direction are different from each other.

26 Claims, 12 Drawing Sheets

(51) Int. Cl.
*G02B 27/01* (2006.01)
*G02B 19/00* (2006.01)
*G02B 3/00* (2006.01)
*G02B 3/08* (2006.01)
*G03B 21/20* (2006.01)

(52) U.S. Cl.
CPC ..... *G02B 19/0009* (2013.01); *G02B 19/0014* (2013.01); *G02B 19/0066* (2013.01); *G02B 27/0101* (2013.01); *G03B 21/208* (2013.01); *B60K 2370/1529* (2019.05); *B60K 2370/31* (2019.05); *B60K 2370/334* (2019.05); *G02B 2027/0118* (2013.01)

(56) References Cited

U.S. PATENT DOCUMENTS

| | | | | |
|---|---|---|---|---|
| 7,635,200 | B2* | 12/2009 | Atsushi | G02B 3/0043 |
| | | | | 362/244 |
| 9,798,140 | B2* | 10/2017 | Inamoto | G02B 27/0101 |
| 10,031,343 | B2* | 7/2018 | Saisho | G03B 21/2073 |
| 2007/0024977 | A1* | 2/2007 | Kawamura | G02B 19/0066 |
| | | | | 359/554 |
| 2009/0231719 | A1* | 9/2009 | Powell | G02B 27/0961 |
| | | | | 359/630 |
| 2011/0128602 | A1* | 6/2011 | Hamano | G02B 26/0841 |
| | | | | 359/205.1 |
| 2014/0368544 | A1* | 12/2014 | Kobayashi | H04N 5/74 |
| | | | | 345/633 |
| 2015/0124227 | A1* | 5/2015 | Kobayashi | G03B 21/2033 |
| | | | | 353/38 |
| 2015/0293402 | A1 | 10/2015 | Shinkai et al. | |
| 2016/0147061 | A1 | 5/2016 | Nambara | |
| 2016/0282617 | A1 | 9/2016 | Asai | |
| 2016/0334075 | A1 | 11/2016 | Nambara | |
| 2017/0146798 | A1 | 5/2017 | Nambara | |
| 2018/0224659 | A1 | 8/2018 | Nambara | |

FOREIGN PATENT DOCUMENTS

| | | |
|---|---|---|
| JP | 5353203 B2 | 11/2013 |
| JP | 2015133304 A | 7/2015 |
| JP | 2015219425 A | 12/2015 |
| JP | 2015232608 A | 12/2015 |
| WO | WO-2014203534 A1 | 12/2014 |
| WO | WO-2015190059 A1 | 12/2015 |
| WO | WO-2016092724 A1 | 6/2016 |

* cited by examiner

HEAD-UP DISPLAY DEVICE

CROSS REFERENCE TO RELATED

This application is a U.S. National Phase Application under 35 U.S.C. 371 of International Application No. PCT/JP2017/000941 filed on Jan. 13, 2017 and published in Japanese as WO/2017/145557 A1 on Aug. 31, 2017. This application is based on and claims the benefit of priority from Japanese Patent Applications No. 2016-032258 filed on Feb. 23, 2016 and No. 2016-080580 filed on Apr. 13, 2016. The entire disclosures of all of the above applications are incorporated herein by reference.

TECHNICAL FIELD

The present disclosure relates to a head-up display device that is mounted on a mobile object and configured to display a virtual image which enables an image to be visually recognized by an occupant.

BACKGROUND ART

Conventionally, a head-up display device (hereinafter abbreviated as HUD device) that is mounted on a mobile object and configured to display a virtual image to enable an image to be visually recognized by an occupant has been known. The HUD device disclosed in Patent Literature 1 includes multiple light emitting devices, an image forming unit, and a light condensing unit. The multiple light emitting devices are aligned with each other and emit illumination light. The image forming unit has an illumination target surface, and the illumination light from each light emitting device illuminates the illumination target surface, to thereby form an image. The light condensing unit condenses the illumination light and causes the condensed illumination light to be incident on the illumination target surface.

In this case, the light condensing unit has a condenser lens provided with a toroidal surface having different curvatures in a longitudinal direction and a lateral direction. In this case, the toroidal surface is a type of anamorphic surface.

However, the toroidal surface of Patent Literature 1 is a single convex surface having the same size as that of the illumination target surface in the condenser lens. Consequently, for example, a design constraint may occur such that a large curvature may be hardly set. Furthermore, since the toroidal surface collectively condenses the illumination light from each light emitting device, the light cannot be efficiently condensed according to the layout of the respective light emitting devices. Therefore, there is a concern that visibility may be hardly enhanced sufficiently in a virtual image formed by projecting an image formed by the image forming unit onto a projection member.

PRIOR TECHNICAL LITERATURE

Patent Literature

Patent Literature 1: JP 5353203 B2

SUMMARY OF INVENTION

It is an object of the present disclosure to provide an HUD device with high visibility of a virtual image.

According to one aspect of the present disclosure, a head-up display device is mounted on a mobile object. The head-up display device is configured to project an image on a projection member to display a virtual image and to enable an occupant to visually recognize the image. The head-up display device comprises a plurality of light emitting devices arranged with each other and each configured to emit an illumination light. The head-up display device further comprises an image forming unit including an illumination target surface. The image forming unit is configured to illuminate a corresponding region of the illumination target surface with the illumination light from one of the light emitting devices to form the image. The head-up display device further comprises a light condensing unit configured to collect the illumination light from each of the light emitting devices and to cause the illumination light to be incident on the illumination target surface. The light condensing unit includes a condenser lens array in which a plurality of lens elements are aligned with each other. The lens elements are paired with the light emitting devices, respectively. Each of the lens elements is provided with a light condensing surface to condense the illumination light. A z-direction is defined as a direction in which surface vertexes of the light condensing surfaces are connected with the light emitting devices paired with the light condensing surfaces, respectively. An x-direction and a y-direction are defined to be orthogonal to each other on a virtual plane orthogonal to the z-direction. The pairs of the condenser lens elements and the light emitting devices are aligned in at least one of the x-direction and the y-direction as an alignment direction. Each of the light condensing surfaces is an anamorphic surface formed in a convex shape in which a curvature in the x-direction and a curvature in the y-direction are different from each other.

BRIEF DESCRIPTION OF THE DRAWINGS

The above and other objects, features and advantages of the present disclosure will become more apparent from the following detailed description made with reference to the accompanying drawings. In the drawings.

The above-described object and another object, features, or advantages of the present disclosure will become more obvious through the specific description below with reference to the accompanying figures. In the drawings.

DESCRIPTION OF EMBODIMENTS

Hereinafter, description will be given of the multiple embodiments of the present disclosure based on the drawings. Corresponding constituent elements in each embodiment are given the same signs, and there are cases in which duplicated explanation is omitted. In a case in which only a portion of the configuration in each embodiment is described, the configuration of another embodiment which is described earlier may be applied for the other portions of the configuration. In addition to the combinations of configurations clearly depicted in the explanation of the embodiments, as long as issues do not particularly arise in a combination, the configurations of multiple embodiments may be partially combined with each other, even when not clearly described.

First Embodiment

Figure 1:
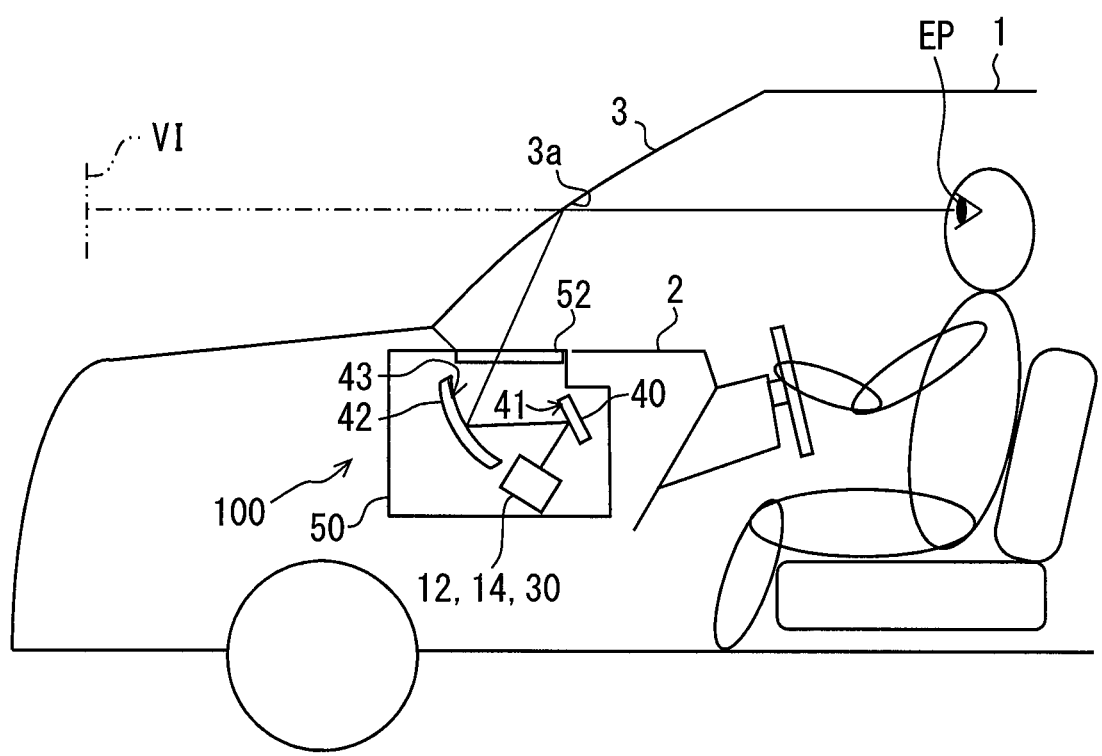
FIG. 1 is a schematic diagram illustrating an installed state of an HUD device in a vehicle according to a first embodiment.

As illustrated in FIG. 1, an HUD device 100 according to a first embodiment of the present disclosure is installed in a vehicle 1 that is one type of a mobile object, and is housed in an instrument panel 2. The HUD device 100 projects an image onto a windshield 3 which serves as a projection member of the vehicle 1. Accordingly, the HUD device 100 displays a virtual image causing an image to be visually recognizable by an occupant of the vehicle 1. In other words, the light of the image which is reflected on the windshield 3 reaches an eye point EP of the occupant in a vehicle interior of the vehicle 1, and the occupant senses the light. The occupant is capable of recognizing various pieces of information which are displayed as a virtual image VI. Examples of various pieces of information which is displayed as the virtual image VI include vehicle state values such as vehicle speed and remaining fuel level, or vehicle information such as road information and visibility auxiliary information.

The windshield 3 of the vehicle 1 is formed in a plate shape and made of a light transmissive glass or a synthetic resin. On a surface of the windshield 3 on the vehicle interior side, a projection surface 3a onto which an image is projected is shaped in a smooth concave surface or a plane. As the projection member, instead of the windshield 3, a combiner that is separate from the vehicle 1 may be installed inside the vehicle 1, and the image may be projected onto the combiner.

A specific configuration of the HUD device 100 described above will be described below with reference to FIGS. 2 to 8. The HUD device 100 includes multiple light emitting devices 12, a light condensing unit 14, an image forming unit 30, a plane mirror 40, and a concave mirror 42, which are housed and held in a housing 50.

Figure 2:
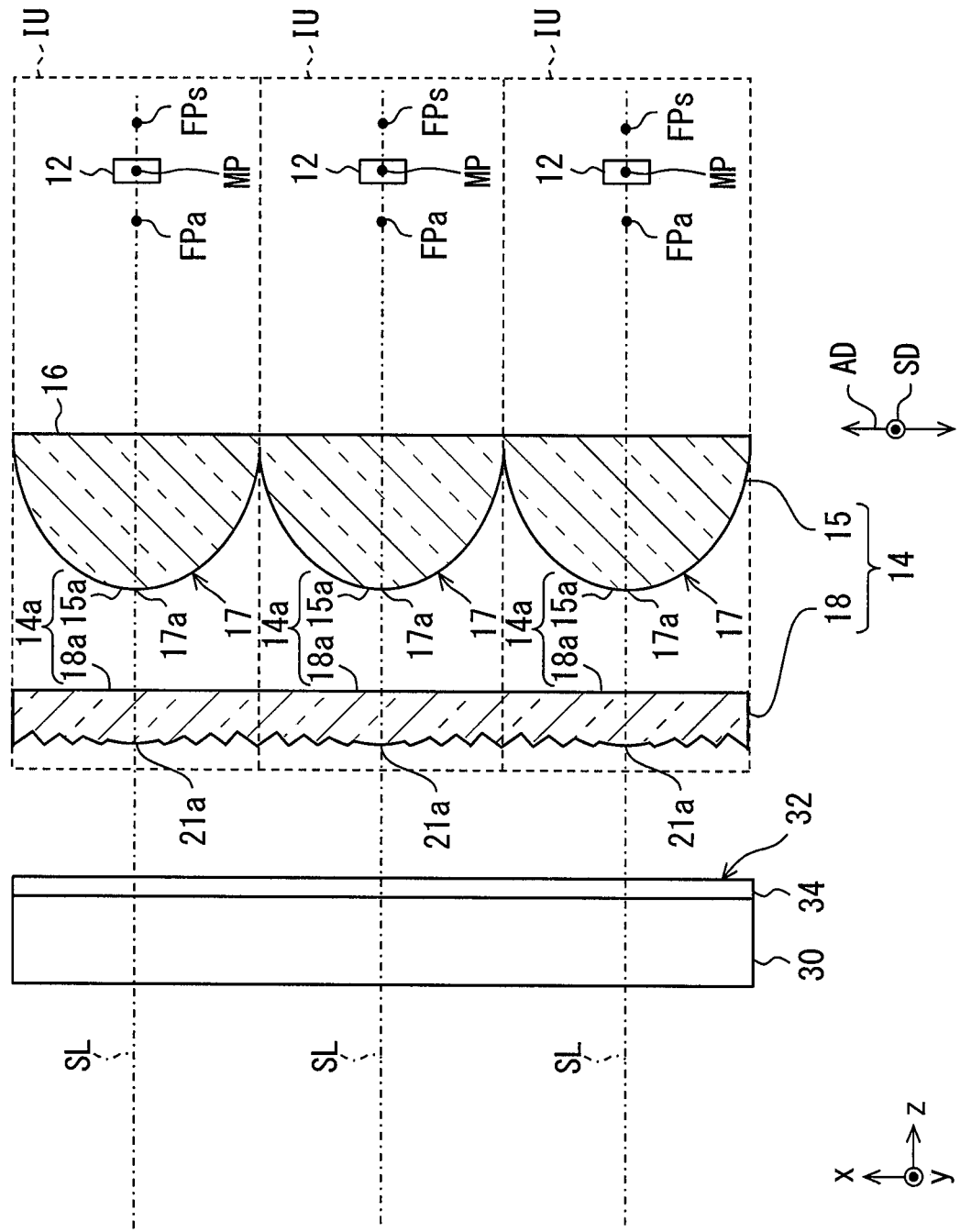
FIG. 2 is a cross-sectional view illustrating a light emitting device, a light condensing unit, and an image forming unit according to the first embodiment, and illustrating a cross section including an alignment direction and a z-direction.
Figure 3:
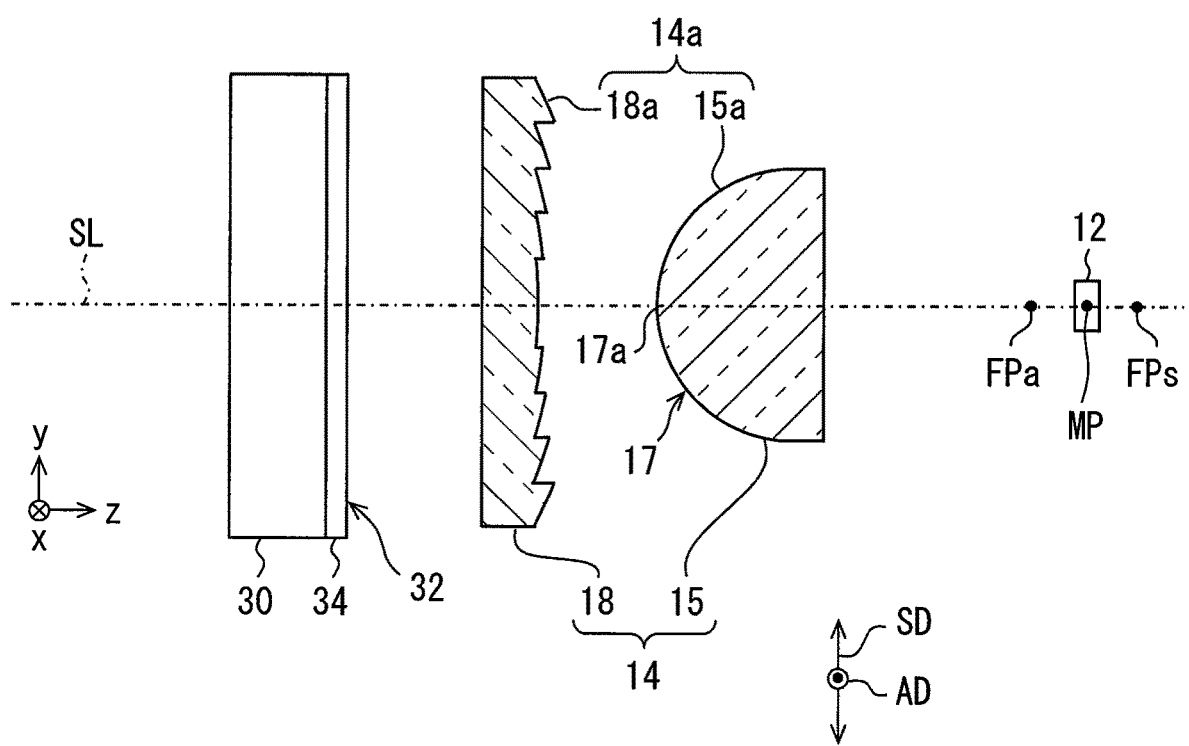
FIG. 3 is a cross-sectional view showing a light emitting device, a light condensing unit, and an image forming unit according to the first embodiment, and showing cross sections including the other direction and the z-direction.

The multiple light emitting devices 12 illustrated in FIGS. 2 and 3 are aligned with each other. Each of the light emitting devices 12 is a light emitting diode device with little heat generation. Each of the light emitting devices 12 is located on a light source circuit board and is electrically connected to a power supply through a wiring pattern on the board. More specifically, each of the light emitting devices 12 is formed by sealing a chip-shaped blue light emitting diode device with a yellow phosphor in which a light transmissive synthetic resin is mixed with a yellow fluorescent agent. The yellow phosphor is excited by the blue light emitted according to the current amount from the blue light emitting diode device to emit the yellow light, and the illumination light of a pseudo white is emitted by combination of the blue light with the yellow light.

Figure 4:
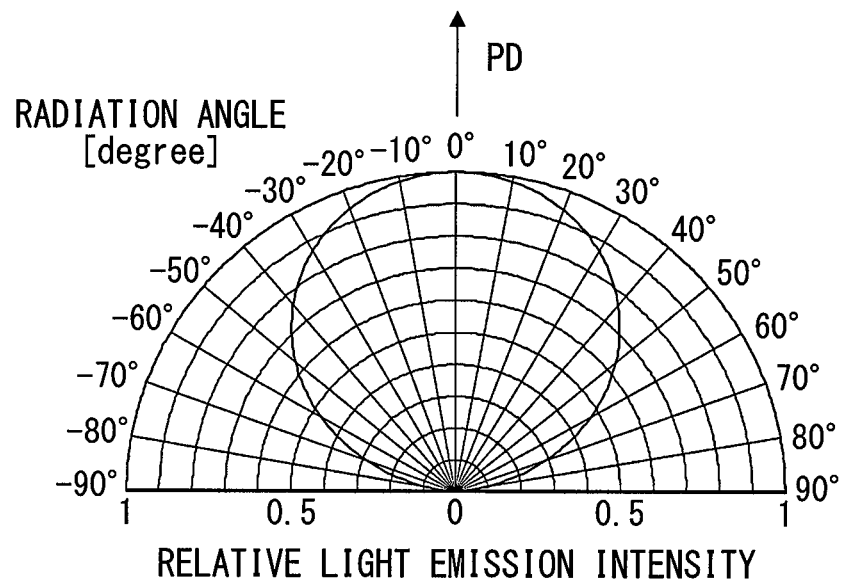
FIG. 4 is a graph illustrating a radiation angle distribution of the light emitting devices according to the first embodiment.

In this example, as illustrated in FIG. 4, each of the light emitting devices 12 emits the illumination light with a radiation angle distribution in which the light emission intensity relatively decreases as the light emission intensity deviates from a peak direction PD where the light emission intensity becomes maximum.

As illustrated in FIGS. 2 and 3, the light condensing unit 14 has a condenser lens array 15 and a compound lens array 18. The light condensing unit 14 is configured to condense and collimate the illumination light from each of the light emitting devices 12 by both of the lens arrays 15 and 18 by condensation so as to be incident on the illumination target surface 32 of the image forming unit 30. In this example, the collimation in the present embodiment represents a state in which the illumination light approaches a collimated light flux more than a state in which the illumination light is radially emitted from each of the light emitting devices 12, and there is no need to put the illumination light into a completely collimated light flux.

The image forming unit 30 according to the present embodiment is a liquid crystal panel formed of a thin film transistor (TFT), and is configured by, for example, an active matrix liquid crystal panel that is formed of multiple liquid crystal pixels arrayed in two-dimensional directions. In the image forming unit 30, a pair of polarizing plates, a liquid crystal layer that are sandwiched between the pair of polarizing plates, and the like are laminated on each other. The polarizing plate has a property to transmit a light whose electric field vector has a predetermined direction and to absorb a light whose electric field vector has a direction substantially perpendicular to the predetermined direction. The pair of polarizing plates are located to be substantially orthogonal to the predetermined direction. The liquid crystal layer is configured to apply the voltage for each liquid crystal pixel to rotate the polarization direction of the light incident on the liquid crystal layer according to an applied voltage.

Therefore, the image forming unit 30 is configured to form an image while controlling a transmittance of the light for each of the liquid crystal pixels according to the incidence of the light on the illumination target surface 32 which is a surface of the panel on the side of the light condensing unit 14. Color filters of mutually different colors (for example, red, green, and blue) are provided in adjacent liquid crystal pixels, and various colors are produced by a combination of those color filters.

Further, the image forming unit 30 has a diffusion unit 34 on a surface on the light condensing unit 14 side. The diffusion unit 34 is located along the illumination target surface 32, and is formed in, for example, a film shape. Alternatively, the diffusion unit 34 may be formed by providing minute irregularities on the illumination target surface 32, for example. The diffusion unit 34 diffuses the collimated illumination light immediately before passing through the image forming unit 30. The light of the image formed by the image forming unit 30 is incident on the plane mirror 40.

The plane mirror 40 illustrated in FIG. 1 is formed by depositing aluminum as a reflecting surface 41 on a surface of a base material made of synthetic resin or glass. The reflecting surface 41 is formed into a smooth flat shape. The plane mirror 40 reflects the light of the image from the image forming unit 30 toward the concave mirror 42.

The concave mirror 42 is formed by depositing aluminum as a reflecting surface 43 on a surface of a base material made of synthetic resin or glass. The reflecting surface 43 is formed into a smooth curved shape in which a center of the concave mirror 42 is concaved as a concave. The concave mirror 42 reflects the light of the image from the plane mirror 40 toward the windshield 3.

A window portion is provided in the housing 50 between the concave mirror 42 and the windshield 3. The window portion is closed by a light transmissive dustproof cover 52. Therefore, the image light from the concave mirror 42 passes through the dustproof cover 52 and is reflected on the windshield 3. In this way, the occupant can visually recognize the light reflected on the windshield 3 as the virtual image VI.

Details of the light emitting device 12, the light condensing unit 14, and the image forming unit 30 in the HUD device 100 described above will be further described below.

As shown in FIGS. 2 and 3, the condenser lens array 15 in the light condensing unit 14 is formed by aligning multiple condenser lens elements 15a made of a light transmissive synthetic resin, glass or the like with each other. The respective condenser lens elements 15a are lens elements of the same number as that of the light emitting devices 12 so as to be paired with the light emitting devices 12 individually. Each of the condenser lens element 15a has a light condensing surface 17 that condenses the illumination light from each of the paired light emitting devices 12. Particularly, in the present embodiment, each of the light condensing surfaces 17 is directed toward the image forming unit 30 side and provided as an emission side surface for emitting the illumination light. On the other hand, an incident side surface 16 on which the illumination light is incident is a single plane having a smooth planar shape common to the respective condenser lens elements 15a.

In this example, a z-direction is defined as a direction connecting surface vertexes 17a of the light condensing surfaces 17 and the respective light emitting devices 12 paired with the light condensing surfaces 17. Then, in a virtual plane orthogonal to the z-direction, an x-direction and a y-direction orthogonal to each other are defined. In the present embodiment, since a normal direction of the incident side surface 16 is located along the z-direction, the virtual plane can be substantially replaced by the incident side surface 16.

In the present embodiment, alignment intervals between the respective light emitting devices 12 aligned with each other are substantially equal to intervals between the respective surface vertexes 17a of the light condensing surfaces 17 in the condenser lens elements 15a aligned with each other. The normal direction of the light condensing surfaces 17 at the surface vertexes 17a is along the z-direction. Furthermore, the distances between the respective light emitting devices 12 and the surface vertexes 17a of the condenser lens elements 15a paired with the light emitting devices 12 are substantially equal to each other in the respective distances.

In the present embodiment, the pair of the condenser lens element 15a and the light emitting device 12 is aligned in the x-direction as an alignment direction AD among the x-direction and the y-direction. In other words, the pair of the condenser lens element 15a and the light emitting device 12 are aligned in one direction in the x-direction. The alignment number of pairs of the condenser lens elements 15a and the light emitting devices 12 in the alignment direction AD is set as Na.

In each of the condenser lens elements 15a described above, each of the light condensing surfaces 17 is an anamorphic surface formed in a smooth convex shape in which the curvature in the x-direction and the curvature in the y-direction are different from each other. In the present embodiment, the curvature in the x-direction is larger than the curvature in the y-direction at the surface vertex 17a and in the vicinity of the surface vertex 17a. In this example, the vicinity of the surface vertex 17a in the present embodiment represents, for example, that a distance from the surface vertex 17a is approximately half the dimension of the light condensing surface in each direction.

Since the x-direction is an alignment direction AD and the y-direction is the other direction SD without alignment, in other words, using the alignment direction AD and the other direction SD, the curvature in the alignment direction AD of each light condensing surface 17 and the curvature in the other direction SD are different from each other. The curvature in the alignment direction AD is larger than the curvature in the other direction SD at the surface vertex 17a and in the vicinity of the surface vertex 17a.

More specifically, when the surface vertex 17a is taken as the origin, a sag amount z of each light condensing surface 17 according to the present embodiment is expressed as follows:

$$z = \frac{c_x x^2 + c_y y^2}{1 + \sqrt{1 - (1 + k_x) c_x^2 x^2 - (1 + k_y) c_y^2 y^2}}.$$ [Expression 1]

In the expression, x is a coordinate in the x-direction, y is a coordinate in the y direction, cx is a curvature in the x-direction at the surface vertex 17a, cy is a curvature in the y direction at the surface vertex 17a, kx is a conic constant in the x direction, and ky is a conic constant in the y-direction.

First, when a magnitude relationship of the curvatures described above is to be replaced according to Expression 1, in the present embodiment, a relationship of cx>cy is satisfied.

Further, a conic constant in the alignment direction AD is set to be smaller than the conic constant in the other direction SD, that is, kx<ky is satisfied. In particular, it is preferable to set the conic constant in the alignment direction AD to be smaller than 0, that is, to satisfy kx<0. Further, it is more preferable that the conic constant in the alignment direction AD is set to −1 or less, that is, kx<−1 is satisfied.

In particular, in the present embodiment, kx=−1 and ky=0 are set. As a result, even if cx>cy is met, a difference between the sag amount in the x-direction and the amount of sag in the y-direction in the outer circumferential portion of the light condensing surface 17 does not occur as much as the difference in curvature.

In other words, in a cross section including the alignment direction AD and the z-direction (xz cross section in the present embodiment), the respective light condensing surfaces 17 are formed in a parabolic shape (refer to FIG. 2). On the other hand, in a cross section including the other direction SD and the z-direction (yz cross section in the present embodiment), the respective light condensing surfaces 17 are formed in an arc shape (in particular, in the present embodiment, a semicircular shape (refer to FIG. 3).

Further, in each of the condenser lens elements 15a aligned with each other, the adjacent light condensing surfaces 17 are connected to each other while forming concave recess portions at a boundary portion of the adjacent light condensing surfaces 17.

In this manner, the illumination light entering the condenser lens array 15 passes through the respective condenser lens elements 15a while making the degree of condensation different between the alignment direction AD and the other direction SD, and then enters the compound lens array 18.

Figure 5:
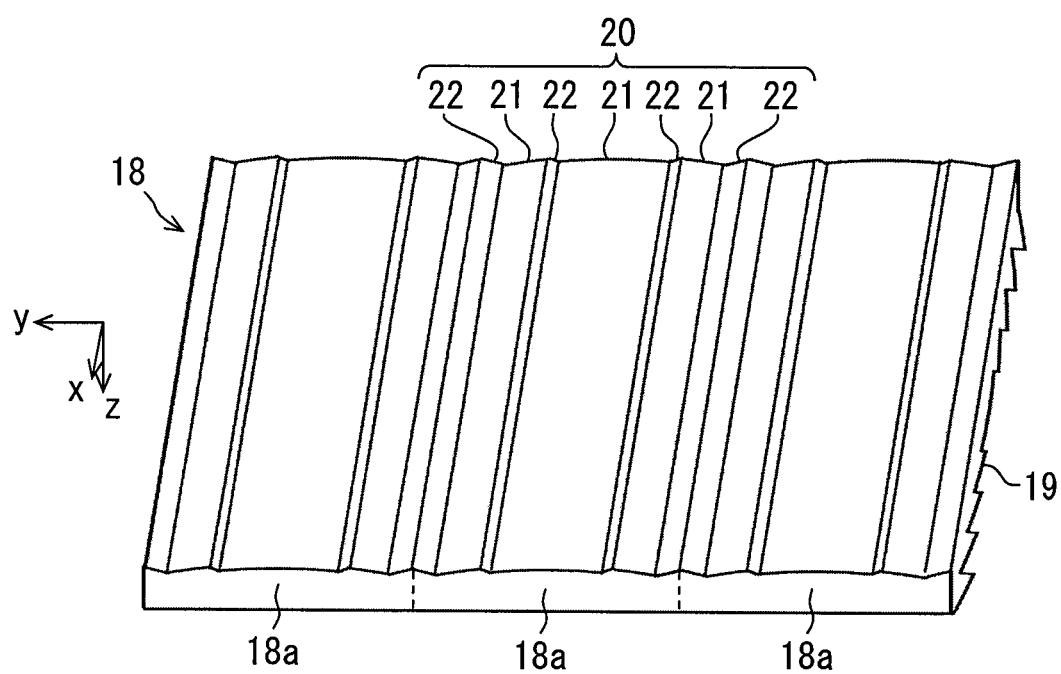
FIG. 5 is a perspective view illustrating a compound lens array according to the first embodiment.

In the light condensing unit 14, the compound lens array 18 is provided on the optical path between the condenser lens array 15 and the illumination target surface 32, and the multiple compound lens elements 18a made of a light transmissive synthetic resin, glass, or the like are aligned with each other and formed. The respective compound lens elements 18a are lens elements of the same number as that of the light emitting devices 12 and the condenser lens element 15a corresponding to the pairs of the condenser lens elements 15a and the light emitting devices 12. In other words, in the present embodiment, in particular, as illustrated in FIG. 2, the compound lens elements 18a of the same number as the alignment number Na are aligned in the alignment direction AD. As illustrated in FIG. 5, each compound lens element 18a has a Fresnel structure in which a condensing Fresnel surface 19 is located as an incident side surface which faces the condenser lens array 15 side and on which the illumination light is incident. On the other hand, the emission side surface that faces the image forming unit 30 side and emits the illumination light is a compound surface 20. In FIG. 5, a partial shape of the compound surface 20 is illustrated in a simplified manner.

Figure 6:
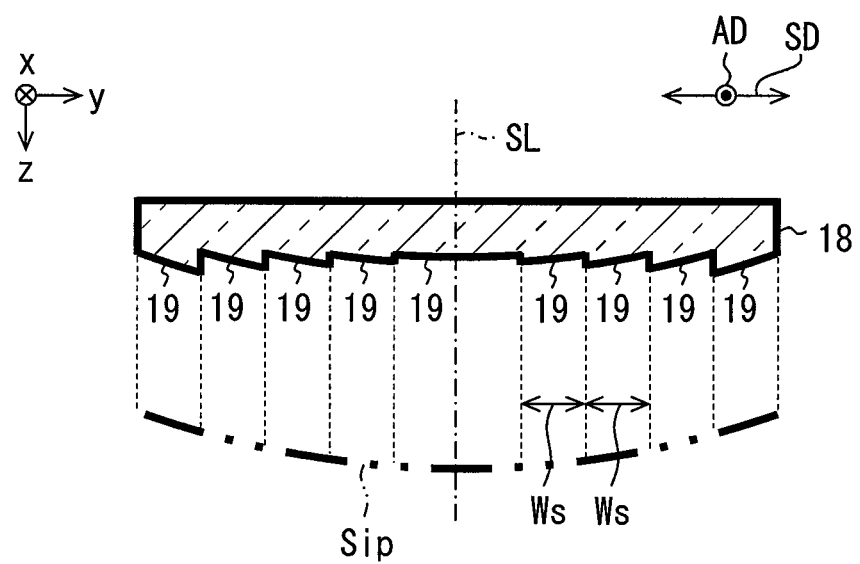
FIG. 6 is a diagram illustrating a condensing Fresnel surface of the compound lens array according to the first embodiment.

As illustrated in detail in FIG. 6, the condensing Fresnel surfaces 19 are formed as partial divided regions obtained by dividing a virtual condensing virtual surface Sip in regions in the other direction SD (in the present embodiment, the y-direction) with a predetermined division width Ws. In this example, the condensing virtual surface Sip has a smooth curved surface shape as a convex surface that is convex toward the condenser lens element 15a side of the condenser lens array 15. In this example, the division width Ws in the divided region of the condensing Fresnel surface 19 is set to a substantially constant value. The condensing Fresnel surface 19 further condenses the illumination light from the condenser lens array 15 by refraction and causes the condensed illumination light to be transmitted through the compound surface 20 side.

Figure 7:
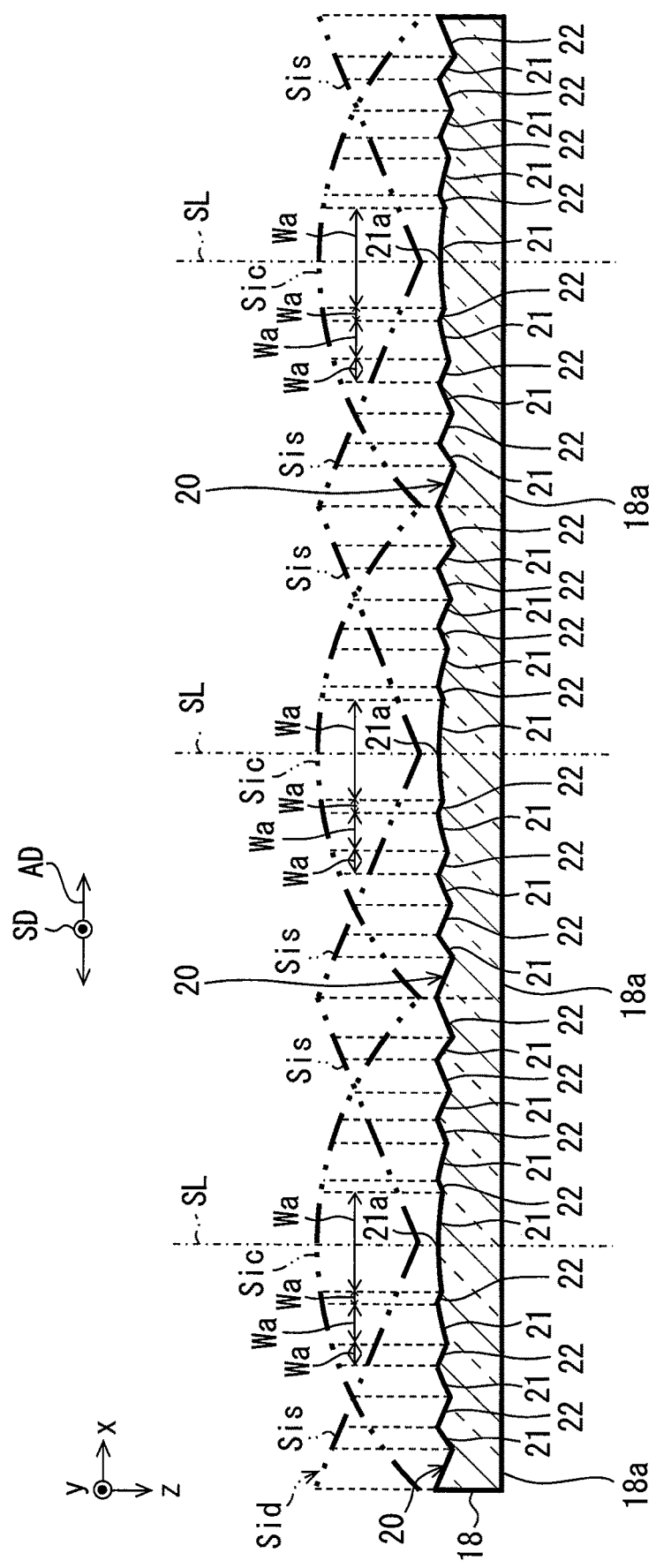
FIG. 7 is a diagram illustrating a compound surface of the compound lens array according to the first embodiment.

As illustrated in detail in FIG. 7, the compound surface 20 forms an alternating alignment structure in which the collimating surfaces 21 and the deflecting surfaces 22 are alternately continuous with each other.

The collimating surface 21 is formed as one divided region obtained by dividing the virtual collimating virtual surface Sic by a predetermined division width Wa in the alignment direction AD (in the present embodiment, the x-direction). In this example, the collimating virtual surface Sic has a smooth curved surface shape as a convex surface that is convex toward the image forming unit 30 side. The curvature of the collimating virtual surface Sic is set to be substantially equal to the curvature of the condensing virtual surface Sip.

The deflecting surface 22 is formed as one divided region obtained by dividing the virtual deflecting virtual surface Sid with a predetermined division width Wa in the alignment direction AD (in the present embodiment, the x-direction). The deflecting virtual surface Sid is configured by multiple inclined surfaces Sis which change to a reverse gradient at a position corresponding to the surface vertex of the collimating virtual surface Sic, and in the present embodiment, each inclined surface Sis has a smooth planar shape. In this case, the gradient of each inclined surface Sis is set to be a gradient on the opposite side to the gradient of the corresponding portion of the collimating virtual surface Sic.

In this case, the division width Wa in the divided region of the collimating surface 21 and the deflecting surface 22 is variously set, but is set such that the sag amount is kept approximately constant between the surfaces 21 and 22, to thereby keep a thickness of the entire compound lens array 18 constant. The collimating surfaces 21 and deflecting surfaces 22 are alternately aligned, as a result of which a part of the shape of the collimating virtual surface Sic and a part of the shape of the deflecting virtual surface Sid are extracted, and reproduced on the compound surface 20.

The collimating surface 21 is configured to condense the illumination light from the condensing Fresnel surface 19 by refraction and collimate the condensed illumination light. Further, the deflecting surface 22 is configured to deflect the illumination light to a side opposite to the refraction by the collimating surface 21.

The surface vertex 21a of the collimating surface 21 including the surface vertex of the collimating virtual surface Sic among the respective collimating surfaces 21 is formed on a straight line SL along the z-direction connecting the light emitting device 12 and the surface vertex 17a of the light condensing surface 17 of the condenser lens element 15a (refer to also FIG. 2). The division width Wa described above is set to be largest in the collimating surface 21 including the surface vertex 21a. The division width Wa is changed so that a ratio of an area of the deflecting surface 22 to the collimating surface 21 increases more as a distance from the surface vertex 21a in the alignment direction AD increases more.

In this manner, as illustrated in FIG. 2, one light emitting device 12 and one condenser lens element 15a form a pair, and one compound lens element 18a corresponding to the pair is provided, to thereby configure one illumination unit IU. In this case, in the illumination unit IU, the condenser lens element 15a and the compound lens element 18a, which are components of the light condensing unit 14, will be collectively referred to as a lens element group 14a. In the present embodiment, the respective illumination units IU aligned with each other have the same configuration.

For each lens element group 14a of each illumination unit IU, a combined focal point (hereinafter referred to as a "combined focal point of the lens element group 14a") is defined by the light condensing surface 17 of the condenser lens element 15a, and the condensing Fresnel surface 19 and the collimating surface 21 of the compound lens element 18a. In this example, a focal position FPa of the combined focal point of the lens element group 14a in the cross section (the xz cross section in the present embodiment) including the alignment direction AD and the z-direction, and a focal position FPs of the combined focal point of the lens element group 14a in the cross section including the other direction SD and the z-direction (the yz section in the present embodiment) are displaced from each other in the z-direction by the light condensing surface 17 which is the anamorphic surface.

More specifically, in the present embodiment, because the curvature of the light condensing surface 17 in the alignment direction AD is larger than the curvature in the other direction SD, a focal position FPa is located closer to the light condensing unit 14 side than a focal position FPs.

Each of the light emitting devices 12 is located between the focal position FPa and the focal position FPs of the corresponding lens element group 14a. In particular, in the present embodiment, the light emitting device 12 is located at an intermediate position MP between the focal position FPa and the focal position FPs.

In each of the illumination units IU, the lens element group 14a captures a partial radiation flux including the light in the peak direction PD of the illumination light of the corresponding light emitting device 12. Part of the partial radiation flux of the captured illumination light can be collimated by condensation as described above. In the present embodiment, the direction of the light emitting device 12 is set so that the peak direction is along the straight line SL, that is, in the z-direction.

In this example, an F value that allows the illumination light having a distribution range in which the light emission intensity of the light emitting device 12 is equal to or greater than a first predetermined ratio (50% in the present embodiment) relative to the peak direction PD to be condensed as the partial radiation flux Is set to Fmin. In addition, an F value that allows the illumination light having a distribution range in which the light emission intensity of the light emitting device 12 is equal to or greater than a second predetermined ratio (90% in the present embodiment) relative to the peak direction PD to be condensed as the partial radiation flux Is set to Fmax. In each of the illumination units IU, the F value of the lens element group 14a is preferably set to be not less than Fmin and not more than Fmax in both the xz cross section and the yz cross section.

As for the light emitting device 12 having a radiation angle distribution according to the present embodiment, in the case of Fmin, referring to an angle at which a relative light emission intensity in FIG. 4 is 0.5, the angle is about ±60 degrees. As a result, the lens element group 14a captures a range of −60° to +60° of the illumination light from the corresponding light emitting device 12 as the partial radiation flux. In the case of Fmax, referring to an angle at which the relative light emission intensity in FIG. 4 is 0.9, the angle is about ±25 degrees. Therefore, the lens element group 14a captures a range of −25 degrees to +25 degrees of the illumination light as the partial radiation flux.

When the F value is brought closer to Fmin, the illumination target surface 32 can be illuminated with the small alignment number Na of the light emitting devices 12, whereas a luminance unevenness of the virtual image VI becomes relatively large. When the F value is brought closer to Fmax, the luminance unevenness of the virtual image VI becomes relatively small, whereas the alignment number Na of the light emitting devices 12 necessary for illuminating the illumination target surface 32 increases.

The illumination light from each of the light emitting devices 12 aligned with each other as described above is collimated in the light condensing unit 14 by the lens element group 14a including the paired condenser lens element 15a by condensation while the illumination light illuminates the corresponding region of each illumination target surface 32.

Figure 8:
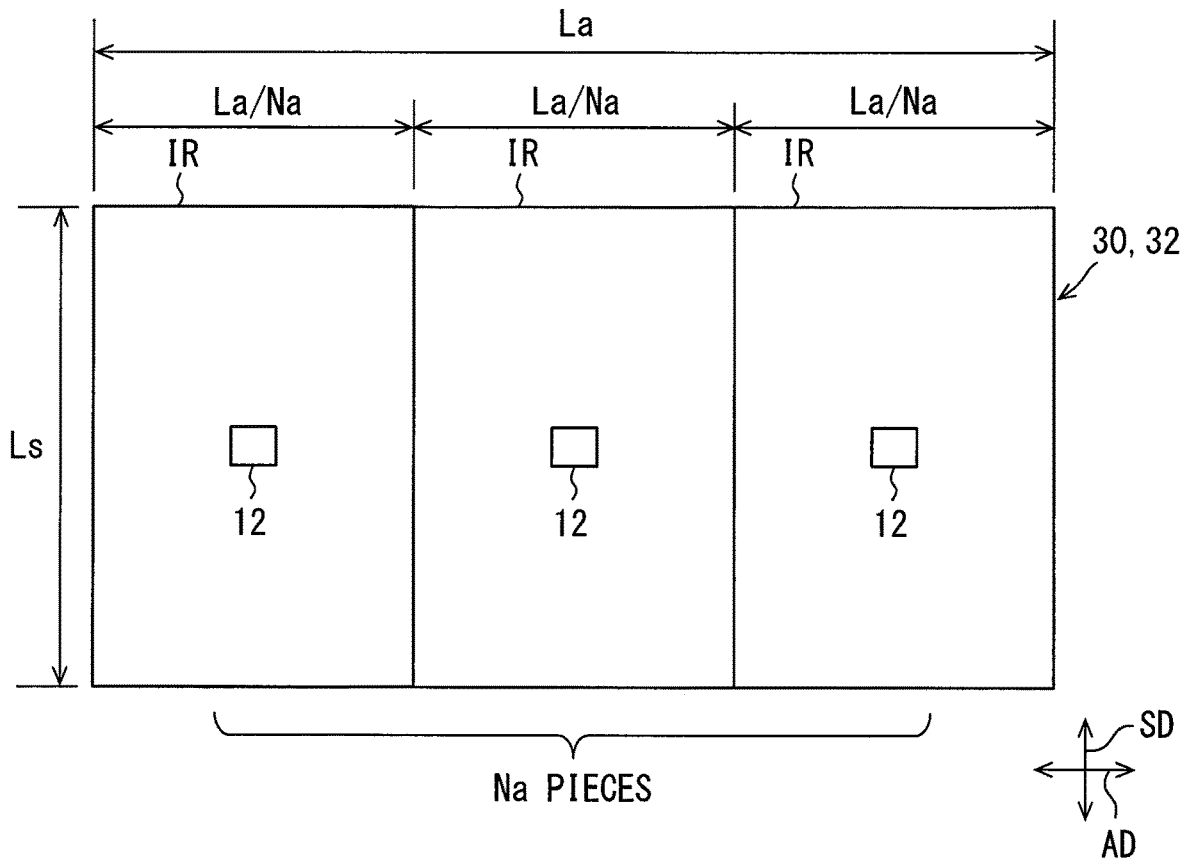
FIG. 8 is a diagram illustrating a relationship between the light emitting devices and an illumination target surface according to the first embodiment.

In this example, as illustrated in FIG. 8, the illumination target surface 32 of the image forming unit 30 is formed in a rectangular shape with a size La on the illumination target surface 32 corresponding to the alignment direction AD, and with a size Ls on the illumination target surface 32 corresponding to the other direction SD. In the present embodiment, since the illumination target surface 32 extends substantially perpendicularly to the straight line SL, the dimension La is substantially a dimension in the alignment direction AD, and the dimension Ls is substantially a dimension in the other direction SD.

In order to efficiently illuminate the entire illumination target surface 32, if the illumination target surface 32 is divided by the alignment number Na in the alignment direction AD, the illumination light from one light emitting device 12 becomes an illumination range IR to be illuminated. In other words, in the present embodiment, the illumination range IR is a rectangular range in which a dimension in the alignment direction AD is La/Na and a dimension in the other direction SD is Ls. In this example, a dimension in the alignment direction AD of the illumination range IR is compared with a dimension in the other direction SD. In the case of La/Na<Ls, the alignment direction AD is a short direction in the illumination range IR. Correspondingly, a curvature of the light condensing surface 17 in the alignment direction AD is to be set to be larger than a curvature in the other direction SD. On the other hand, in the case of La/Na>Ls, the alignment direction AD is a longitudinal direction in the illumination range IR. Correspondingly, the curvature of the light condensing surface 17 in the alignment direction AD is to be set to be smaller than the curvature in the other direction SD. In other words, the curvature in the direction corresponding to the longitudinal direction is set to be smaller than the curvature in the direction corresponding to the short direction, corresponding to the dimensions of the illumination range IR.

In the present embodiment, since La/Na<Ls is met, the alignment direction AD is the short direction and the other direction SD is the longitudinal direction in the illumination range IR. Corresponding to the illumination range ID, the curvature of the light condensing surface 17 in the alignment direction AD is larger than the curvature of the other direction SD.

As a specific example, a case in which a rectangular illumination target surface 32 having a dimension La of 40 mm and a dimension Ls of 20 mm is illuminated with the use of the light emitting device 12 having three alignment numbers Na will be described. In the illumination range IR, the dimension in the alignment direction AD is La/Na=13.3 mm and the dimension in the other direction SD is Ls=20 mm. In other words, in the illumination range IR, the alignment direction AD is the short direction and the other direction SD is the longitudinal direction.

In this example, it is assumed that the light condensing surface 17 is set as a spherical surface, the combined focal length of the lens element group 14a in each of the illumination units IU is set to 14.5 mm, the light emitting device 12 is located at a position of the combined focal point, and the lens element group 14a is configured so that the light emitting device 12 illuminates the illumination range IR described above. In this case, the F value of the lens element group 14a is 1.16 in the alignment direction AD and 0.725 in the other direction SD. In other words, in the alignment direction AD, the partial radiation flux in the distribution range in which the light emission intensity of the light emitting device 12 is about 90% or more of that in the peak direction PD is captured. On the other hand, in the other direction SD, the partial radiation flux in the distribution range in which the light emission intensity of the light emitting device 12 is about 72% or more of that in the peak direction PD is captured. In the other direction SD, since the lens element group 14a captures the illumination light in the direction in which the light emission intensity is relatively low among the illumination light emitted from the corresponding light emitting device 12, a luminance unevenness larger than that in the alignment direction AD may occur in the virtual image VI.

Therefore, the light condensing surface 17 is set as not a spherical surface but an anamorphic surface so that the F values in both of the directions AD and SD match each other, and the curvature of the other direction SD with respect to the curvature of the alignment direction AD is set to 0.72/0.9, that is, 1/1.25. As a result, the corresponding region illuminated by each of the light emitting devices 12 is configured to match the rectangular illumination range IR while the luminance unevenness in both of the directions AD and SD is adjusted to the same degree.

(Operational Effects)

The operations and effects of the first embodiment which is described above will be described hereinafter.

According to the first embodiment, the anamorphic surface formed in a convex shape in which the curvature in the x-direction and the curvature in the y-direction are different from each other is formed as the light condensing surface 17 of the condenser lens element 15a. Since the condenser lens elements 15a are aligned with each other in the condenser lens array 15 of the light condensing unit 14, a large curvature can be set for the illumination target surface 32, for example. Since the condenser lens elements 15a are paired with the respective light emitting devices 12, the curvature in each direction is set as the light condensing surface 17 so that efficient condensation corresponding to the alignment of the respective light emitting devices 12 can be performed. As described above, since each of the light emitting devices 12 is configured to efficiently illuminate the corresponding region of the illumination target surface 32, the virtual image VI resulting from the projection of the image formed by the image forming unit 30 onto the windshield 3 can be improved in visibility.

According to the first embodiment, in the case of La/Na<Ls, the curvature in the alignment direction AD is larger than the curvature in the other direction SD, and in the case of La/Na>Ls, the curvature in the alignment direction AD is smaller than the curvature in the other direction SD. In other words, the magnitude of the curvature of the light condensing surface 17 in each of the directions AD and SD is set according to the magnitude of the dimension per one light emitting device 12 of the illumination target surface 32 in each of the directions AD and SD.

In this example, in the corresponding region of the illumination target surface 32 illuminated by one light emitting device 12, a width of the illumination in the direction with the small curvature can be configured to be wider than the width of the illumination in the direction with the large curvature, with the use of the light condensing surface 17 that is a convexly shaped anamorphic surface. With the use of the above relationship, the width of the illumination in both of the directions AD and SD matches the magnitude of the dimension per the light emitting device 12 on the illumination target surface 32 in both of the directions AD and SD. Therefore, the range of the corresponding region illuminated by the illumination light from each light emitting device 12 is optimized, and the entire illumination target surface 32 is efficiently illuminated. Therefore, the visibility of the virtual image VI can be improved.

Further, according to the first embodiment, since the sag amount z of the light condensing surface 17 is expression as in the Expression, the light condensing surface 17 as the anamorphic surface formed in a convex shape in which the curvature in the x-direction and the curvature in the y-direction are different from each other can be easily produced.

According to the first embodiment, a conic constant in the alignment direction AD is set to −1 or less. With the above configuration, in the condenser lens array 15 in which the condenser lens elements 15a are aligned in the alignment direction AD, a possibility that a normal direction of the light condensing surface 17 is perpendicular to the z-direction in the vicinity of the adjacent portion of the light condensing lens element 15a is excluded, and the gradient of the light condensing surface 17 in the vicinity of the adjacent portion can be made gentle. Therefore, since the loss of the illumination light that can be caused due to a shape in which the light condensing surfaces 17 having a large gradient face each other can be surely reduced, the entire illumination target surface 32 is efficiently illuminated. Therefore, the visibility of the virtual image VI can be improved.

According to the first embodiment, the conic constant in the alignment direction AD is smaller than the conic constant ky in the other direction SD. With the configuration described above, while the curvature is different between the alignment direction AD and the other direction SD, in the condenser lens array 15 in which the condenser lens elements 15a are aligned in the alignment direction AD, the gradient of the light condensing surface 17 in the vicinity of the adjacent portion of the condenser lens elements 15a can be made relatively gentle. Therefore, since the loss of the illumination light that can be caused due to a shape in which the light condensing surfaces 17 having a large gradient face each other can be reduced, the entire illumination target surface 32 is efficiently illuminated. Therefore, the visibility of the virtual image VI can be improved.

Further, according to the first embodiment, the light condensing surfaces 17 are formed in a parabolic shape in a cross section including the alignment direction AD and the z-direction. With the above configuration, in the condenser lens array 15 in which the condenser lens elements 15a are aligned in the alignment direction AD, a possibility that a normal direction of the light condensing surface 17 is perpendicular to the z-direction in the vicinity of the adjacent portion of the condenser lens element 15a is excluded, and the gradient of the light condensing surface 17 in the vicinity of the adjacent portion can be made gentle. Therefore, since the loss of the illumination light that can be caused due to a shape in which the light condensing surfaces 17 having a large gradient face each other can be surely reduced, the entire illumination target surface 32 is efficiently illuminated. Therefore, the visibility of the virtual image VI can be improved.

Further, according to the first embodiment, the compound lens array 18 as the compound lens provided with the compound surface 20 is located on the optical path between the condenser lens array 15 and the illumination target surface 32. In this example, the compound surface 20 forms an alternating alignment structure in which the collimating surface 21 that collimates the illumination light by refraction and the deflecting surface 22 that deflects the illumination light to the side opposite to the refraction of the collimating surface 21 are alternately continuous with each other. In the alignment structure, a part of the illumination light condensed on the condenser lens element 15a from the corresponding light emitting device 12 is collimated by the collimating surface 21, while the other part is refracted by the deflecting surface 22 to the side opposite to the refraction on the collimating surface 21. As a result, the efficient illumination corresponding to the alignment of the light emitting devices 12 is produced by the light condensing surface 17 as an anamorphic surface, and further, a part of the illumination light is mixed with the other part, thereby being capable of reducing a luminance unevenness of the virtual image VI. Therefore, the visibility of the virtual image VI can be improved.

Second Embodiment

Figure 9:
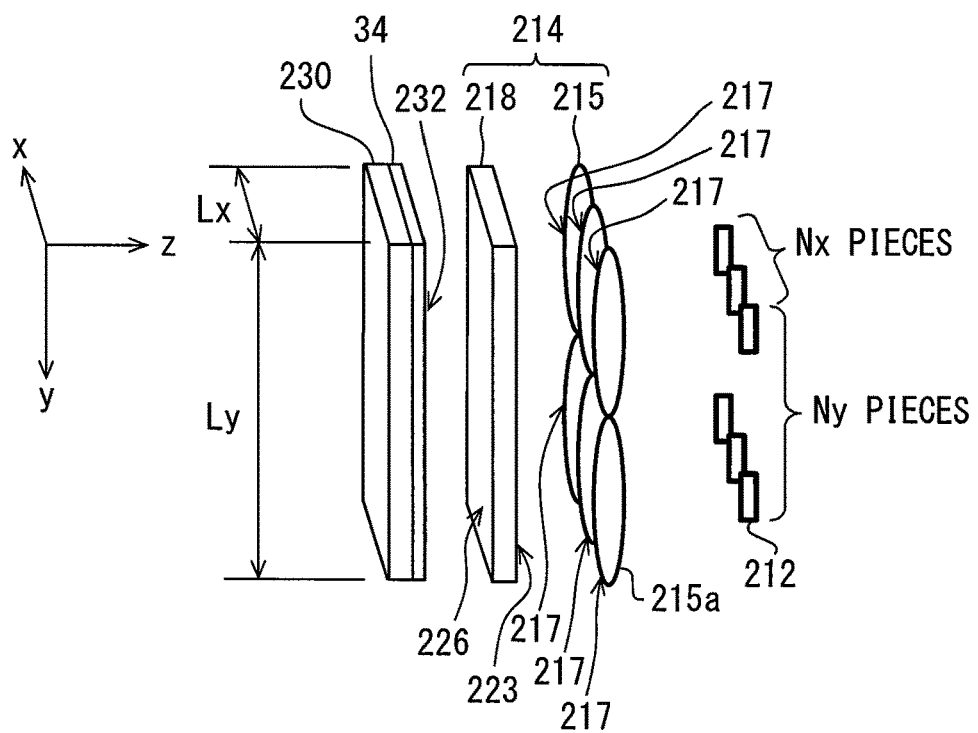
FIG. 9 is a diagram illustrating light emitting devices, a light condensing unit, and an image forming unit according to a second embodiment.
Figure 10:
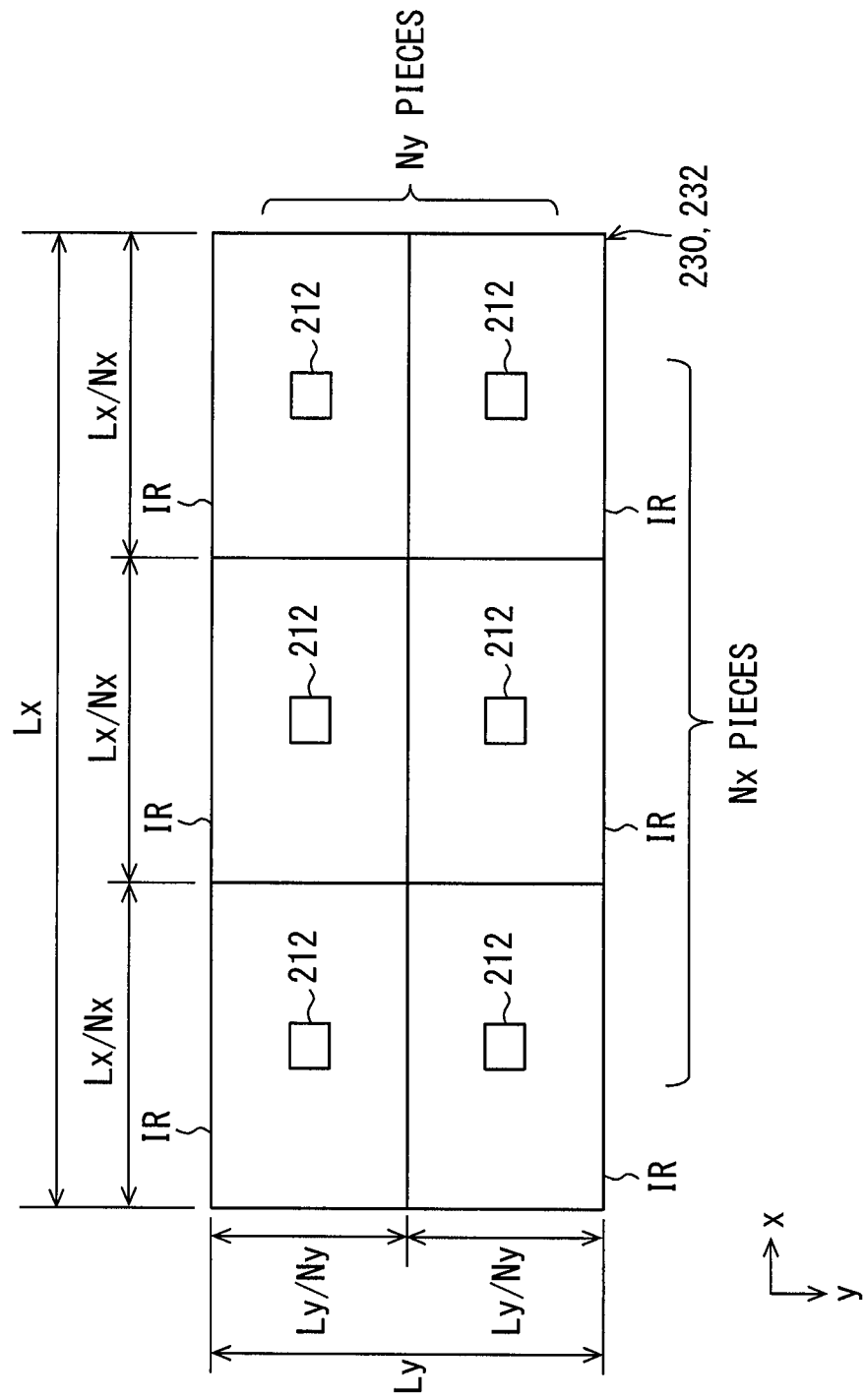
FIG. 10 is a diagram corresponding to FIG. 8 according to the second embodiment.

As illustrated in FIGS. 9 and 10, a second embodiment according to the present disclosure is a modification of the first embodiment. A description will be given of the second embodiment, centered on features which differ from those in the first embodiment.

As shown in FIG. 9, as in the first embodiment, a light condensing unit 214 according to the second embodiment includes a condenser lens array 215 in which condenser lens elements 215a each having a light condensing surface 217 which is an anamorphic surface are aligned with each other. In FIG. 9, only parts of the condenser lens elements 215a and the light emitting devices 212 are denoted by reference numerals.

In the second embodiment, pairs of the condenser lens elements 215a and the light emitting devices 212 are aligned with each other in both of an x-direction and a y-direction as alignment directions. In this example, Nx pieces of the pairs of the condenser lens elements 215a and the light emitting devices 212 are aligned in the x-direction and Ny pieces are aligned in the y-direction. Particularly, in the present embodiment, the case where the number of alignment Nx is 3 and the number of alignment Ny is 2 is shown.

In this example, as illustrated in FIG. 10, an illumination target surface 232 of an image forming unit 230 is formed in a rectangular shape with a size Lx on the illumination target surface 232 corresponding to the x-direction, and with a size Ly on the illumination target surface 232 corresponding to the y-direction. As in the first embodiment, since the illumination target surface 232 extends substantially perpendicularly to a straight line, the dimension Lx is substantially a dimension in the x-direction, and the dimension Ly is substantially a dimension in the y-direction.

In order to efficiently illuminate the entire illumination target surface 232, if the illumination target surface 232 is divided by the alignment number Nx in the x-direction, and the illumination target surface 232 is divided by the alignment number Ny in the y-direction, the illumination light from one light emitting device 212 becomes an illumination range IR to be illuminated. In other words, in the present embodiment, the illumination range IR is a rectangular range in which a dimension in the x-direction is Lx/Nx and a dimension in the y-direction is Ly/Ny. In this example, a dimension in the x-direction of the illumination range IR is compared with a dimension in the y-direction. In the case of Lx/Nx<Ly/Ny, the x-direction is a short direction in the illumination range IR. Correspondingly, a curvature of the light condensing surface 217 in the x-direction is to be set to be larger than a curvature in the y-direction. On the other hand, in the case of Lx/Nx>Ly/Ny, the x-direction is a longitudinal direction in the illumination range IR. Correspondingly, a curvature of the light condensing surface 217 in the x-direction is to be set to be smaller than a curvature in the y-direction. In other words, the curvature in the direction corresponding to the longitudinal direction is set to be smaller than the curvature in the direction corresponding to the short direction, corresponding to the illumination range IR.

In the present embodiment, since Lx/Nx>Lx/Ly is met, the x-direction is the longitudinal direction and the y-direction is the short direction in the illumination range IR. Corresponding to the illumination range ID, the curvature of the light condensing surface 17 in the x-direction is smaller than the curvature in the y-direction.

Figure 11:
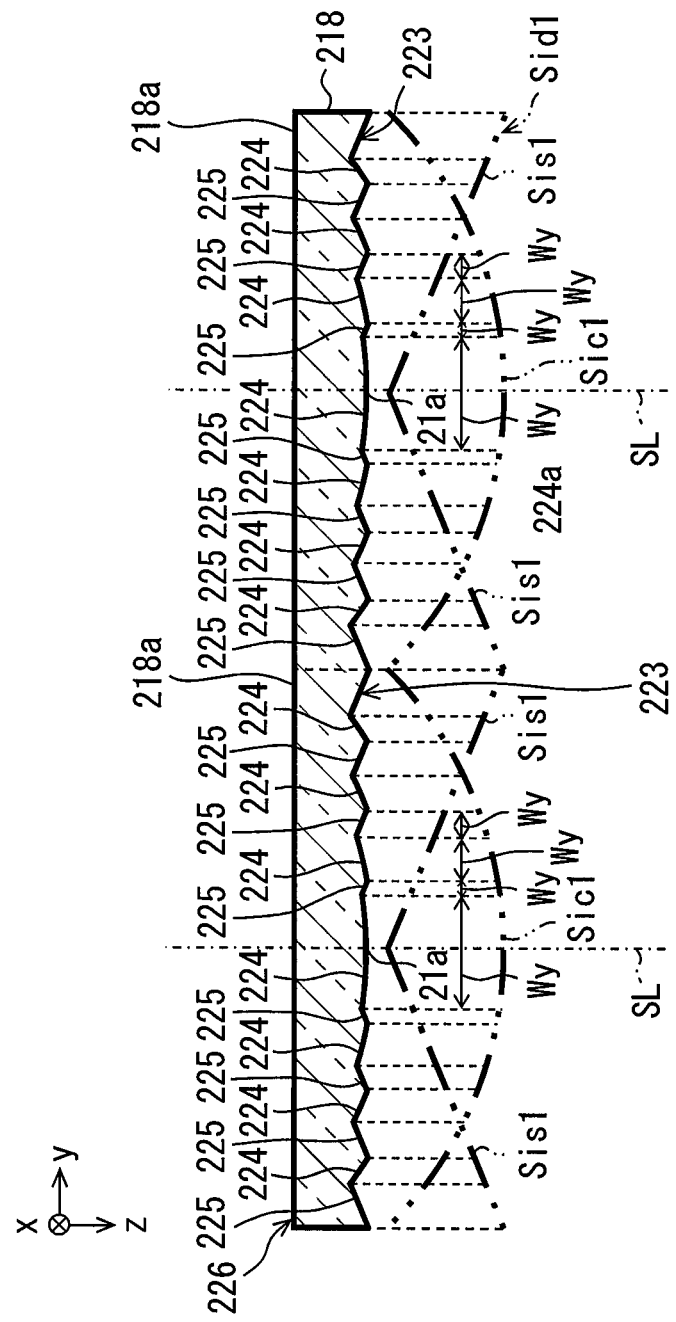
FIG. 11 is a cross-sectional view illustrating a compound lens array according to the second embodiment and illustrating a cross section including a y-direction and a z-direction.
Figure 12:
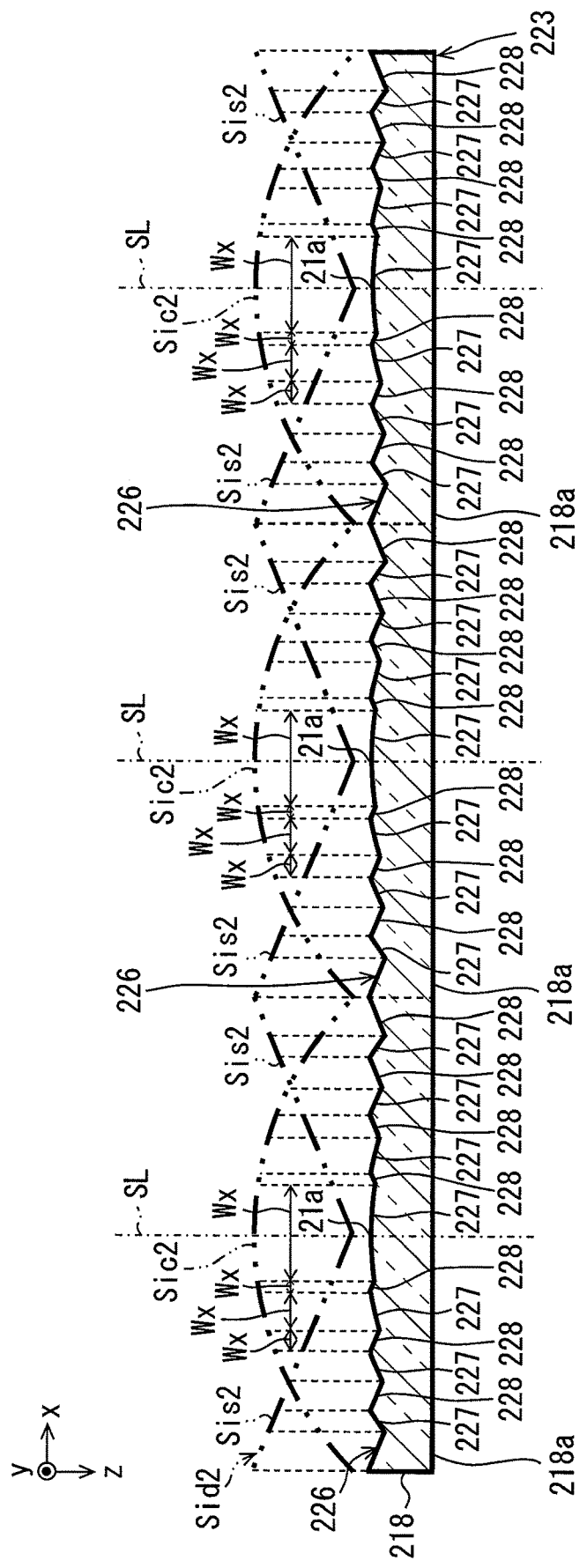
FIG. 12 is a cross-sectional view illustrating a compound lens array according to the second embodiment and illustrating a cross section including an x-direction and the z-direction.

As in the first embodiment, in the light condensing unit 214 according to the second embodiment, a compound lens array 218 is provided on the optical path between the condenser lens array 215 and the illumination target surface 232, and multiple compound lens elements 218a are aligned with each other and formed. The respective compound lens elements 218a are lens elements of the same number as that of the light emitting devices 212 and the condenser lens element 215a corresponding to the pairs of the condenser lens elements 215a and the light emitting devices 212. In other words, in the present embodiment, Nx pieces of the pairs of the compound lens elements 218a are aligned in the x-direction and Ny pieces are aligned in the y-direction. As illustrated in FIG. 11, each of the compound lens elements 218a has an incident side compound surface 223 as an incident side surface that faces the condenser lens array 215 side and receives the illumination light. On the other hand, as illustrated in FIG. 12, each of the compound lens elements 218a has an emission side compound surface 226 as an emission side surface that faces the image forming unit 230 side and emits the illumination light.

As illustrated in detail in FIG. 11, the incident side compound surface 223 forms an alternating alignment structure in which the collimating surfaces 224 and the deflecting surfaces 225 are alternately continuous with each other.

The collimating surface 224 of the incident side compound surface 223 is formed as one divided region obtained by dividing a virtual collimating virtual surface Sic1 by a predetermined division width Wy in the y-direction. The collimating virtual surface Sic1 has a smooth curved surface shape as a convex surface that is convex toward the condenser lens element 215a side of the condenser lens array 215.

The deflecting surface 225 of the incident side compound surface 223 is formed as one divided region obtained by dividing a virtual deflecting virtual surface Sid1 by a predetermined division width Wy in the y-direction. In this example, the deflecting virtual surface Sid1 is configured by multiple inclined surfaces Sis1 which change to a reverse gradient at a position corresponding to the surface vertex of the collimating virtual surface Sic1, and in the present embodiment, each inclined surface Sis1 has a smooth planar shape. In this case, the gradient of each inclined surface Sis1 is set to be a gradient on the opposite side to the gradient of the corresponding portion of the collimating virtual surface Sic1.

The collimating surfaces 224 and the deflecting surfaces 225 are alternately aligned, as a result of which a part of the shape of the collimating virtual surface Sic1 and a part of the shape of the deflecting virtual surface Sid1 are extracted, and reproduced on the incident side compound surface 223. The other detailed configuration of the incident side compound surface 223 can be referred to the compound surface 20 of the first embodiment.

As illustrated in detail in FIG. 12, the emission side compound surface 226 forms an alternating alignment structure in which the collimating surfaces 227 and the deflecting surfaces 228 are alternately continuous with each other.

The collimating surface 227 of the emission side compound surface 226 is formed as one divided region obtained by dividing a virtual collimating virtual surface Sic2 by a predetermined division width Wx in the x-direction. The collimating virtual surface Sic2 has a smooth curved surface shape as a convex surface that is convex toward the image forming unit 230 side. The curvature of the collimating surface 227 of the emission side compound surface 226 is set to be substantially equal to the curvature of the collimating surface 224 of the incident side compound surface 223.

The deflecting surface 228 of the emission side compound surface 226 is formed as one divided region obtained by dividing a virtual deflecting virtual surface Sid2 by a predetermined division width Wx in the x-direction. In this example, the deflecting virtual surface Sid2 is configured by multiple inclined surfaces Sis2 which change to a reverse gradient at a position corresponding to the surface vertex of the collimating virtual surface Sic2, and in the present embodiment, each inclined surface Sis2 has a smooth planar shape. In this case, the gradient of each inclined surface Sis2 is set to be a gradient on the opposite side to the gradient of the corresponding portion of the collimating virtual surface Sic2.

The collimating surfaces 227 and the deflecting surfaces 228 are alternately aligned, as a result of which a part of the shape of the collimating virtual surface Sic2 and a part of the shape of the deflecting virtual surface Sid2 are extracted, and reproduced on the emission side compound surface 226. The other detailed configuration of the emission side compound surface 226 can be referred to the compound surface 20 of the first embodiment.

The collimating surfaces 224 and 227 described above are configured to condense the illumination light from the condenser lens array 215 by refraction and collimate the condensed illumination light. Further, each of the deflecting surface 225, 228 is configured to deflect the illumination light to a side opposite to the refraction by the collimating surfaces 224 and 227.

In each of the compound surfaces 223 and 226, the alternating alignment structure is formed in such a state that a boundary between the compound lens elements 218a is not known in the entire region on the optical path of the compound lens array 218. However, since the division directions of the incident side compound surface 223 and the emission side compound surface 226 are substantially orthogonal to each other as described above, the function as the compound lens elements 218a aligned in the x-direction and the y-direction is exhibited.

Also, in the second embodiment described above, since the light condensing surface 217 is an anamorphic surface in which the curvature in the x-direction and the curvature in the y-direction are different from each other, the operational effects according to the first embodiment can be exhibited.

In addition, according to the second embodiment, in the case of $Lx/Nx<Ly/Ly$, when the curvature in the x-direction is larger than the curvature in the y-direction, and in the case of $Lx/Nx>Ly/Ny$, the curvature in the x-direction is smaller than the curvature in the y-direction. In other words, the magnitude of the curvature of the light condensing surface 217 in both of the directions is set according to the magnitude of the dimension per one light emitting device 212 of the illumination target surface 232 in both of the directions.

In this example, in the corresponding region of the illumination target surface 232 illuminated by one light emitting device 212, a width of the illumination in the direction with the small curvature can be configured to be wider than the width of the illumination in the direction with the large curvature, with the use of the light condensing surface 217 that is a convexly shaped anamorphic surface. With the use of the above relationship, the width of the illumination in both of the directions matches the magnitude of the dimension per the light emitting device 212 on the illumination target surface 232 in both of the directions AD and SD. Therefore, the range of the corresponding region illuminated by the illumination light from each light emitting device 212 is optimized, and the entire illumination target surface 232 is efficiently illuminated. Therefore, the visibility of the virtual image VI can be improved.

OTHER EMBODIMENTS

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

Specifically, as Modification 1, the conic constant kx and ky can arbitrarily be set on the light condensing surface 17. For example, in the first embodiment, the conic constant in the alignment direction AD may be greater than the conic constant in the other direction SD, and the conic constant in the alignment direction AD may be 0 or more.

In Modification 2, the light condensing surface 17 may be an anamorphic surface formed in a convex shape in which the curvature in the x-direction and the curvature in the y-direction are different from each other, and the sag amount z of the light condensing surface 17 may be expressed by a power series polynomial curved surface.

In Modification 3, the light condensing surface 17 may be formed in a hyperbolic shape, an elliptical arc shape, an arc shape, or the like other than a parabolic shape in a cross section including the alignment direction AD and the z-direction.

In Modification 4 related to the first embodiment, the light condensing surface 17 may be formed in a hyperbolic shape, a parabolic shape, an elliptical arc shape, or the like other than a circular arc shape in a cross section including the other direction SD and z-direction.

In Modification 5, the light condensing surface 17 may be provided as an incident side surface that faces the light emitting device 12 side and receives the illumination light.

In Modification 6, the light emitting device 12 may be arranged at the focal position FPa of the combined focal point of the lens element group 14a. The light emitting devices 12 may be arranged at the focal position FPs of the combined focal point of the lens element group 14a.

Figure 13:
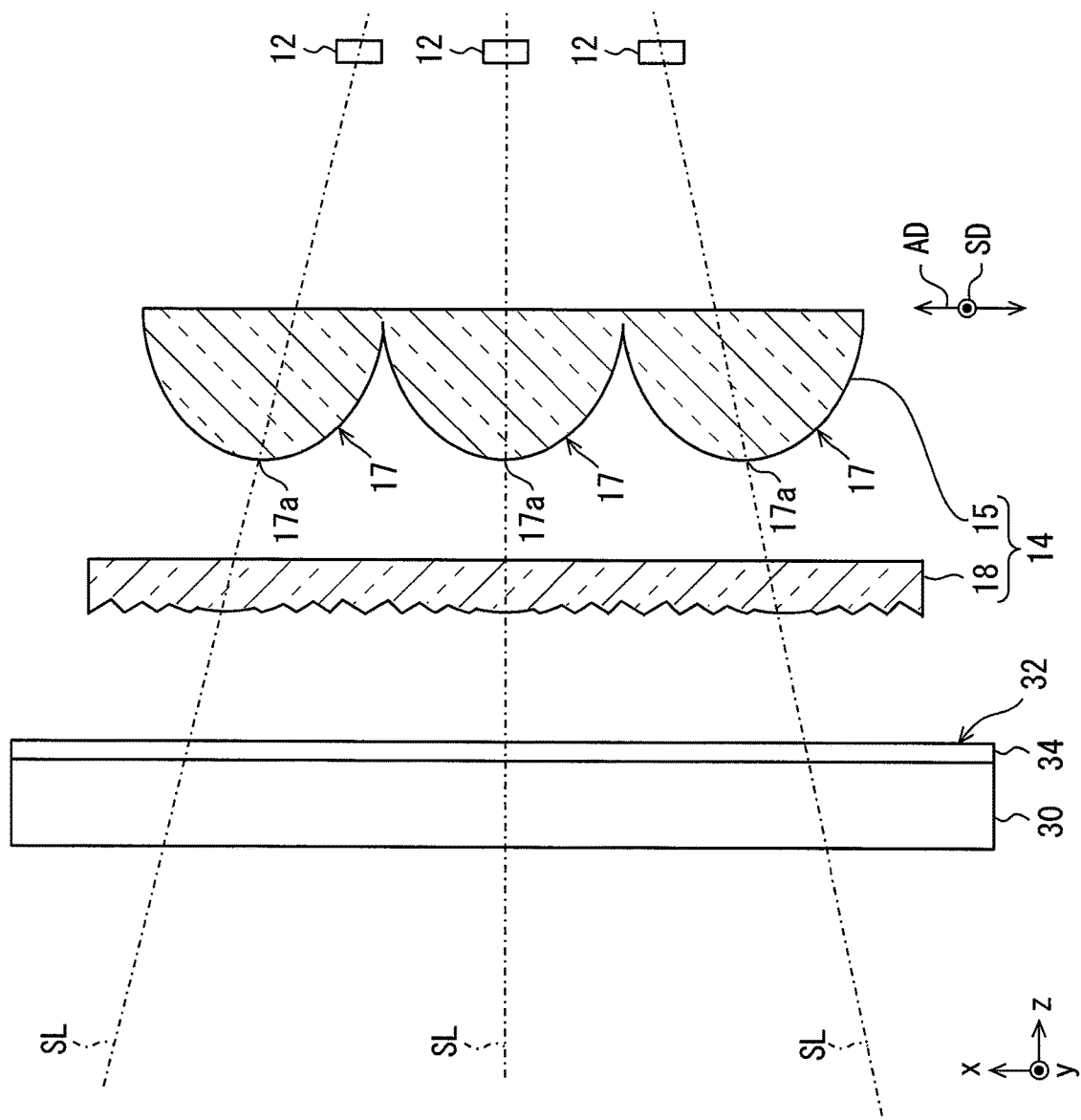
FIG. 13 is a diagram corresponding to FIG. 2 according to a modification 7.

As illustrated in FIG. 13, in Modification 7, alignment intervals between the respective light emitting devices 12 aligned with each other may be different from the intervals between the respective surface vertexes 17a of the light condensing surfaces 17 in the condenser lens elements 15a aligned with each other. Under the condition, a direction connecting the surface vertex 17a of the light condensing surface 17 and the paired light emitting device 12 can be different between the respective pairs of the condenser lens elements 15a and the light emitting devices 12. In such a case, the z-direction can be defined on behalf of, for example, the center pair of the respective pairs. Alternatively, a direction obtained by averaging the directions connecting the surface vertexes 17a of the light condensing surface 17 and the paired light emitting devices 12 can be defined as the z-direction.

In Modification 8 of the first embodiment, in the compound lens array 18, the curvature of the condensing virtual surface Sip forming the condensing Fresnel surface 19 and the curvature of the collimating virtual surface Sic forming the collimating surface 21 may be different from each other. As an example, the curvature of the condensing virtual surface Sip is made different from the curvature of the collimating virtual surface Sic, thereby configuring the light condensing unit 14 so that the focal position FPa of the combined focal point of the lens element group 14a matches the focal position FPs.

In Modification 9 of the second embodiment, in the compound lens array 218, the division direction of the collimating surface 224 and the deflecting surface 225 in the incident side compound surface 223 may be replaced with the division direction of the collimating surface 227 and the deflecting surface 228 in the emission side compound surface 226.

In Modification 10 of the second embodiment, in the compound lens array 218, one of the incident side compound surface 223 and the emission side compound surface 226 can be replaced by another surface shape. Other surface shapes include a condensing Fresnel surface as in the first embodiment and a single convex surface provided in a smooth curved surface common to the respective compound lens elements 218a.

Figure 14:
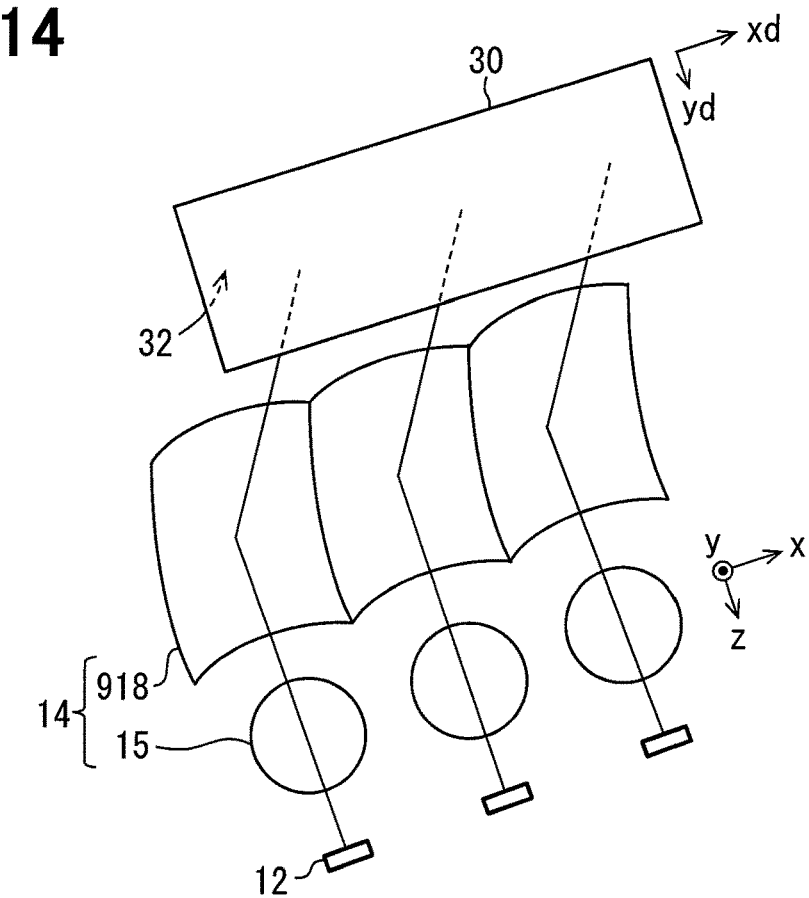
FIG. 14 is a diagram illustrating light emitting devices, a light condensing unit, and an image forming unit in an example of a modification 9.

In Modification 11, in the light condensing unit 14, the compound lens array 18 may be replaced with another optical member such as a single condenser lens. In this example, as illustrated in FIG. 14, when the optical element changes the direction of the illumination light of the reflecting mirror 918 or the like, for example, a direction xd corresponding to the x-direction on the illumination target surface 32 or a direction yd corresponding to the y-direction on the illumination target surface 32 may be different from the x-direction or the y-direction according to a change in the direction of the illumination light.

In Modification 12, the light condensing unit 14 may be constituted by only the condenser lens array 15. In addition, the light condensing unit 14 may be configured by adding another optical member to the condenser lens array 15 and the compound lens array 18.

In Modification 13, the dimension La and the dimension Ls of the illumination target surface 32 may coincide with each other.

In Modification 14, the illumination target surface 32 may be a triangular shape, a circular shape, or the like other than the rectangular shape. Further, the illumination target surface 32 may be a curved surface other than a planar surface.

In Modification 15, the image forming unit 30 may not have the diffusion unit 34.

In Modification 16, only the y-direction of the x-direction and the y-direction may be the alignment direction AD.

Figure 15:
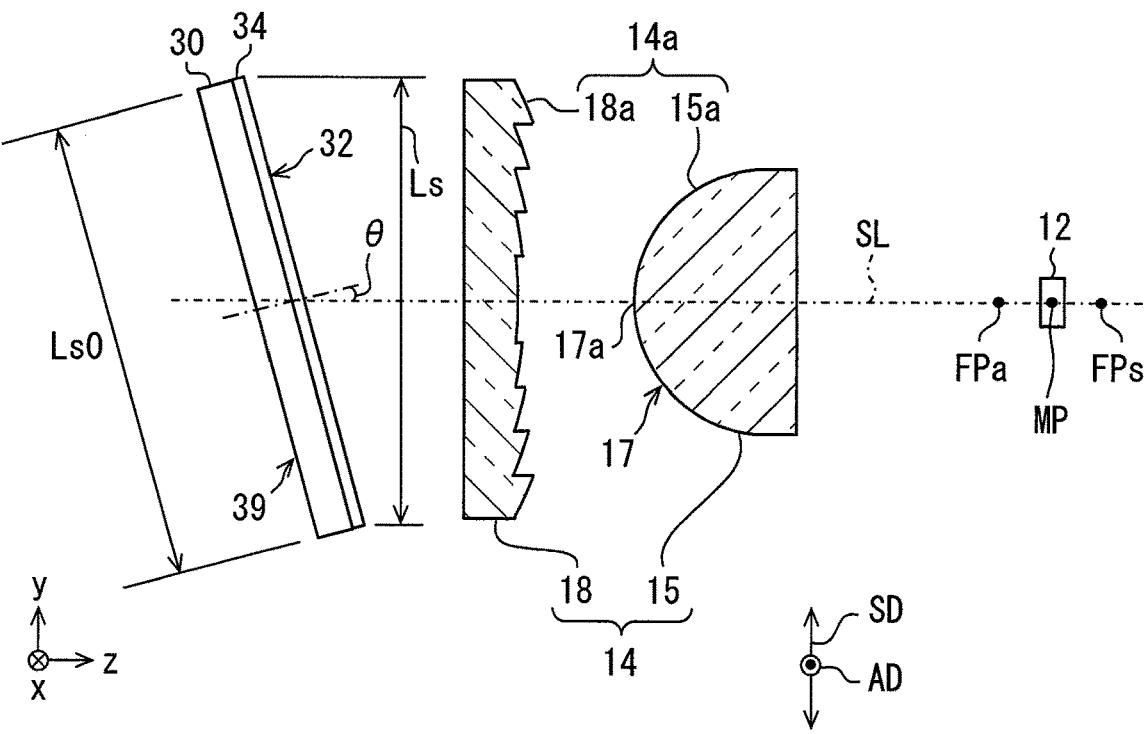
FIG. 15 is a diagram corresponding to FIG. 3 according to a modification 17.

In Modification 17, in the image forming unit 30, the illumination target surface 32 may not be extended perpendicular to the straight line SL. For example, as illustrated in FIG. 15, the image forming unit 30, which is a transmissive and flat plate-like shaped liquid crystal panel, may be located with a normal direction of the illumination target surface 32 being inclined with respect to the straight line SL. Specifically, it is preferable that the normal direction of the illumination target surface 32 is an angle (for example, expressed as θ in FIG. 15) of about 10 to 25 degrees with respect to the straight line SL. Since the liquid crystal pixel in the image forming unit 30 basically has no element for deflecting light, the light of the image formed by the image forming unit 30 is also emitted along the straight line SL (however, a part of the light is subjected to the diffusion action of the diffusion unit 34).

More specifically, the image forming unit 30 is inclined with the longitudinal direction of the illumination target surface 32 (that is, the alignment direction AD) as a rotation axis. Therefore, the image forming unit 30 is located in a state in which the illumination target surface 32 is inclined with respect to the other direction SD (that is, the y-direction). As a result of the above arrangement, the distance between the compound lens array 18 and the image forming unit 30 is different depending on the position in the cross section including the other direction SD and the z-direction (that is, the yz cross section).

In the image forming unit 30, a planar reflecting surface 39 is formed on the side facing the plane mirror 40, for example, by a mirror surface configured as a surface of a glass substrate. For example, when an external light such as sunlight passes through the windshield 3 and is reflected on the concave mirror 42 and the plane mirror 40 to reach the image forming unit 30, the possibility that the external light enters the image forming unit 30 along the straight line SL is high. In this example, the external light is reflected in a direction different from the straight line SL by the reflecting surface 39 substantially parallel to the illumination target surface 32. Therefore, the external light reflected on the reflecting surface 39 can be prevented from reaching the eye point EP together with the image light.

It is preferable that the inclination direction or angle of the image forming unit 30 is set so as to satisfy a Scheimpflug condition or to come close to the condition in consideration of the alignment angle of the plane mirror 40, the concave mirror 42, and the windshield 3. According to the inclination direction and angle described above, the virtual image VI viewed from the eye point EP can be prevented from being inclined and visually recognized.

Further, as illustrated in FIG. 15, the illumination target surface 32 has a normal direction that is inclined θ degrees with respect to the straight line SL, for example, with the alignment direction AD as the rotation axis. In the illumination target surface 32, a value obtained by multiplying cos θ by an actual dimension Ls0 in the cross section (that is, the yz cross section) including the other direction SD and the z-direction of the illumination target surface 32 can be used as a dimension Ls on the illumination target surface 32 corresponding to the other direction SD.

Further, the illumination target surface has the normal direction that is inclined φ degrees with respect to the straight line SL, for example, with the other direction SD as the rotation axis. In the illumination target surface, a value obtained by multiplying cos φ by an actual dimension in the cross section (that is, the xz cross section) including the alignment direction AD and the z-direction of the illumination target surface can be used as a dimension La on the illumination target surface corresponding to the alignment direction AD.

In the application of the values of the dimensions Lx and Ly in the case where both of the x-direction and the y-direction are the alignment directions as in the second embodiment, the same idea as that of the application of the values in those dimensions La and Ls can be applied.

In Modification 18, in the compound lens array 18, the division width Wa in the region division of the collimating surface 21 and the deflecting surface 22 may be set to be substantially the same width at each position.

In Modification 19, the compound surface 20 of the compound lens array 18 may have a configuration in which the shape of the collimating surface 21 is replaced with an inclined planar shape.

In Modification 20, the present disclosure may be applied to various mobile objects (transportation equipment) such as vessels or aircraft other than the vehicle 1.

The head-up display device described above is mounted on the mobile object 1 and projects an image on the projection member 3, thereby displaying a virtual image allowing the occupant to visually recognize the image. The multiple light emitting devices 12 and 212 are aligned with each other and emit illumination light. The image forming units 30 and 230 have illumination target surfaces 32 and 232, and the illumination light from each light emitting device illuminates a corresponding region of the illumination target surface to form an image. The light condensing units 14 and 214 condense the illumination light from the respective light emitting devices and cause the condensed illumination light to be incident on the illumination target surface. The light condensing unit is configured by multiple lens elements paired with the respective light emitting devices. The light condensing unit has the condenser lens arrays 15 and 215 in which the condenser lens elements 15a and 215a provided with the light condensing surfaces 17 and 217 for condensing the illumination light are aligned with each other. The z-direction is defined as a direction connecting a surface vertex 17a of the light condensing surface and the light emitting device paired with the surface vertex. The x-direction and the y-direction orthogonal to each other on a virtual plane orthogonal to the z-direction are defined. The pair of the condenser lens element and the light emitting device is aligned in at least one of the x-direction and the y-direction as an alignment direction AD. Each light condensing surface is an anamorphic surface formed in the convex shape in which the curvature in the x-direction and the curvature in the y-direction are different from each other.

According to the disclosure described above, the anamorphic surface formed in a convex shape in which the curvature in the x-direction and the curvature in the y-direction are different from each other is formed as the light condensing surface of the condenser lens element. Since the condenser lens elements are aligned with each other in the condenser lens array of the light condensing unit, a large curvature can be set for the illumination target surface, for example. Since the condenser lens elements are paired with the respective light emitting devices, the curvature in each direction is set as the light condensing surface so that efficient condensation corresponding to the alignment of the respective light emitting devices can be performed. As described above, since each of the light emitting devices can efficiently illuminate the corresponding region of the illumination target surface, the virtual image resulting from the projection of the image formed by the image forming unit onto the projection member can be improved in visibility.

The present disclosure is described based on the embodiments, and it is understood that this disclosure is not limited to the embodiments or the structure. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

What is claimed is:

1. A head-up display device mounted on a mobile object, the head-up display device configured to project an image on a projection member to display a virtual image and to enable an occupant to visually recognize the image, the head-up display device comprising:

a plurality of light emitting devices arranged with each other and each configured to emit an illumination light;

an image forming unit including an illumination target surface, the image forming unit configured to illuminate a corresponding region of the illumination target surface with the illumination light from one of the light emitting devices to form the image; and a light condensing unit configured to collect the illumination light from each of the light emitting devices and to cause the illumination light to be incident on the illumination target surface, wherein the light condensing unit includes a condenser lens array in which a plurality of condenser lens elements are aligned with each other, the condenser lens elements are paired with the light emitting devices, respectively, each of the condenser lens elements is provided with a light condensing surface to condense the illumination light, a z-direction is defined as a direction in which surface vertexes of the light condensing surfaces are connected with the light emitting devices paired with the light condensing surfaces, respectively, an x-direction and a y-direction are defined to be orthogonal to each other on a virtual plane orthogonal to the z-direction, the pairs of the condenser lens elements and the light emitting devices are aligned in at least one of the x-direction and the y-direction as an alignment direction, each of the light condensing surfaces is an anamorphic surface formed in a smooth convex shape in both the x-direction and the y-direction in which a curvature in the x-direction and a curvature in the y-direction are different from each other, one of the x-direction and the y-direction is set as the alignment direction and the other is set as the other direction, the illumination target surface is in a rectangular shape having a dimension La in a direction on the illumination target surface corresponding to the alignment direction and having a dimension Ls in a direction on the illumination target surface corresponding to the other direction, an alignment number of pairs of the condenser lens elements and the light emitting devices in the alignment direction is Na, La/Na<Ls is satisfied, the curvature in the alignment direction is greater than the curvature in the other direction, the light condensing unit has an incident side surface that is opposed to the light emitting devices and on which the illumination light is incident, and the incident side surface is a single plane having a smooth planar shape common to the respective condenser lens elements aligned in the alignment direction.

2. The head-up display device according to claim 1, wherein a sag amount z of the light condensing surface is expressed by:

$$z = \frac{c_x x^2 + c_y y^2}{1 + \sqrt{1 - (1 + k_x)c_x^2 x^2 - (1 + k_y)c_y^2 y^2}} \quad [\text{Expression 1}]$$

wherein
the surface vertex is taken as an origin,
a coordinate in the x-direction is x,
a coordinate in the y-direction is y,
the curvature in the x-direction in the surface vertex is cx,
the curvature in the y-direction in the surface vertex is cy,
a conic constant in the x-direction is kx, and
a conic constant in the y-direction is ky.

3. The head-up display device according to claim 2, wherein the conic constant in the alignment direction is −1 or less.

4. The head-up display device according to claim 1, wherein
a sag amount z of the light condensing surface is expressed by:

$$z = \frac{c_x x^2 + c_y y^2}{1 + \sqrt{1 - (1 + k_x)c_x^2 x^2 - (1 + k_y)c_y^2 y^2}} \quad [\text{Equation 2}]$$

wherein
the surface vertex is taken as an origin,
a coordinate in the x-direction is x,
a coordinate in the y-direction is y,
the curvature in the x-direction in the surface vertex is cx,
the curvature in the y-direction in the surface vertex is cy,
a conic constant in the x-direction is kx,
a conic constant in the y-direction is ky, and
the conic constant in the alignment direction is smaller than the conic constant in the other direction.

5. The head-up display device according to claim 1, wherein each of the light condensing surfaces is formed in a parabolic shape in a cross section including the alignment direction and the z-direction.

6. The head-up display device according to claim 1, wherein
the light condensing unit further includes a compound lens having a compound surface on an optical path between the condenser lens array and the illumination target surface,
the compound surface forms an alternating alignment structure in which a collimating surface and a deflecting surface are alternately continuous with each other,
the collimating surface is configured to collimate the illumination light by refraction, and
the deflecting surface is configured to deflect the illumination light to a side opposite to the refraction of the collimating surface.

7. The head-up display device according to claim 1, wherein
the light condensing unit is integrally formed.

8. The head-up display device according to claim 7, wherein
each of the light condensing surfaces is convex in both a cross section taken along an axis along the x-direction and a cross section taken along an axis along the y-direction.

9. The head-up display device according to claim 1, wherein
the incident side surface of the light condensing unit is a proximal surface proximal to the light emitting devices and on which the illumination light is incident, and
the light condensing unit further including a distal surface.

10. A head-up display device mounted on a mobile object, the head-up display device configured to project an image on a projection member to display a virtual image and to enable an occupant to visually recognize the image, the head-up display device comprising:
a plurality of light emitting devices arranged with each other and each configured to emit an illumination light;
an image forming unit including an illumination target surface, the image forming unit configured to illuminate a corresponding region of the illumination target surface with the illumination light from one of the light emitting devices to form the image; and
a light condensing unit configured to collect the illumination light from each of the light emitting devices and to cause the illumination light to be incident on the illumination target surface, wherein
the light condensing unit includes a condenser lens array in which a plurality of condenser lens elements are aligned with each other,
the condenser lens elements are paired with the light emitting devices, respectively,
each of the condenser lens elements is provided with a light condensing surface to condense the illumination light,
a z-direction is defined as a direction in which surface vertexes of the light condensing surfaces are connected with the light emitting devices paired with the light condensing surfaces, respectively,
an x-direction and a y-direction are defined to be orthogonal to each other on a virtual plane orthogonal to the z-direction,
the pairs of the condenser lens elements and the light emitting devices are aligned in at least one of the x-direction and the y-direction as an alignment direction,
each of the light condensing surfaces is an anamorphic surface formed in a smooth convex shape in both the x-direction and the y-direction in which a curvature in the x-direction and a curvature in the y-direction are different from each other,
one of the x-direction and the y-direction is set as the alignment direction and the other is set as the other direction,
the illumination target surface is in a rectangular shape having a dimension La in a direction on the illumination target surface corresponding to the alignment direction and having a dimension Ls in a direction on the illumination target surface corresponding to the other direction,
an alignment number of pairs of the condenser lens elements and the light emitting devices in the alignment direction is Na,
La/Na>Ls is satisfied, and
the curvature in the alignment direction is smaller than the curvature in the other direction,
the light condensing unit has an incident side surface that is opposed to the light emitting devices and on which the illumination light is incident, and
the incident side surface is a single plane having a smooth planar shape common to the respective condenser lens elements aligned in the alignment direction.

11. The head-up display device according to claim 10, wherein
a sag amount z of the light condensing surface is expressed by:

$$z = \frac{c_x x^2 + c_y y^2}{1 + \sqrt{1 - (1+k_x)c_x^2 x^2 - (1+k_y)c_y^2 y^2}} \quad \text{[Expression 1]}$$

wherein
the surface vertex is taken as an origin,
a coordinate in the x-direction is x,
a coordinate in the y-direction is y,
the curvature in the x-direction in the surface vertex is cx,
the curvature in the y-direction in the surface vertex is cy,
a conic constant in the x-direction is kx, and
a conic constant in the y-direction is ky.

12. The head-up display device according to claim 11, wherein the conic constant in the alignment direction is −1 or less.

13. The head-up display device according to claim 10, wherein
a sag amount z of the light condensing surface is expressed by:

$$z = \frac{c_x x^2 + c_y y^2}{1 + \sqrt{1 - (1+k_x)c_x^2 x^2 - (1+k_y)c_y^2 y^2}} \quad \text{[Equation 2]}$$

wherein
the surface vertex is taken as an origin,
a coordinate in the x-direction is x,
a coordinate in the y-direction is y,
the curvature in the x-direction in the surface vertex is cx,
the curvature in the y-direction in the surface vertex is cy,
a conic constant in the x-direction is kx,
a conic constant in the y-direction is ky, and
the conic constant in the alignment direction is smaller than the conic constant in the other direction.

14. The head-up display device according to claim 10, wherein each of the light condensing surfaces is formed in a parabolic shape in a cross section including the alignment direction and the z-direction.

15. The head-up display device according to claim 10, wherein
the light condensing unit further includes a compound lens having a compound surface on an optical path between the condenser lens array and the illumination target surface,
the compound surface forms an alternating alignment structure in which a collimating surface and a deflecting surface are alternately continuous with each other,
the collimating surface is configured to collimate the illumination light by refraction, and
the deflecting surface is configured to deflect the illumination light to a side opposite to the refraction of the collimating surface.

16. The head-up display device according to claim 10, wherein
the light condensing unit is integrally formed.

17. The head-up display device according to claim 16, wherein
each of the light condensing surfaces is convex in both a cross section taken along an axis along the x-direction and a cross section taken along an axis along the y-direction.

18. The head-up display device according to claim 10, wherein
the incident side surface of the light condensing unit is a proximal surface proximal to the light emitting devices and on which the illumination light is incident, and
the light condensing unit further including a distal surface.

19. A head-up display device mounted on a mobile object, the head-up display device configured to project an image on a projection member to display a virtual image and to enable an occupant to visually recognize the image, the head-up display device comprising:
a plurality of light emitting devices arranged with each other and each configured to emit an illumination light;
an image forming unit including an illumination target surface, the image forming unit configured to illuminate a corresponding region of the illumination target surface with the illumination light from one of the light emitting devices to form the image; and
a light condensing unit configured to collect the illumination light from each of the light emitting devices and to cause the illumination light to be incident on the illumination target surface, wherein
the light condensing unit includes a condenser lens array in which a plurality of condenser lens elements are aligned with each other,
the condenser lens elements are paired with the light emitting devices, respectively,
each of the condenser lens elements is provided with a light condensing surface to condense the illumination light,
a z-direction is defined as a direction in which surface vertexes of the light condensing surfaces are connected with the light emitting devices paired with the light condensing surfaces, respectively,
an x-direction and a y-direction are defined to be orthogonal to each other on a virtual plane orthogonal to the z-direction,
the pairs of the condenser lens elements and the light emitting devices are aligned in at least one of the x-direction and the y-direction as an alignment direction,
each of the light condensing surfaces is an anamorphic surface formed in a smooth convex shape in both the x-direction and the y-direction in which a curvature in the x-direction and a curvature in the y-direction are different from each other,
both of the x-direction and the y-direction are set as the alignment direction,
the illumination target surface is formed in a rectangular shape having a dimension Lx in a direction on the illumination target surface corresponding to the x-direction and a dimension Ly in a direction on the illumination target surface corresponding to the y-direction,
Nx number of pairs of the condenser lens elements and the light emitting devices are aligned in the x-direction, Ny number of pairs of the condensing lens elements and the light emitting devices are aligned in the y-direction, Lx/Nx<Ly/Ny is satisfied, and
the curvature in the x-direction is greater than the curvature in the y-direction;
the light condensing unit has an incident side surface that is opposed to the light emitting devices and on which the illumination light is incident, and the incident side surface is a single plane having a smooth planar shape common to the respective condenser lens elements aligned in the alignment direction.

20. The head-up display device according to claim 19, wherein
the light condensing unit is integrally formed.

21. The head-up display device according to claim 20, wherein
each of the light condensing surfaces is convex in both a cross section taken along an axis along the x-direction and a cross section taken along an axis along the y-direction.

22. The head-up display device according to claim 19, wherein
the incident side surface of the light condensing unit is a proximal surface proximal to the light emitting devices and on which the illumination light is incident, and
the light condensing unit further including a distal surface.

23. A head-up display device mounted on a mobile object, the head-up display device configured to project an image on a projection member to display a virtual image and to enable an occupant to visually recognize the image, the head-up display device comprising:
a plurality of light emitting devices arranged with each other and each configured to emit an illumination light;
an image forming unit including an illumination target surface, the image forming unit configured to illuminate a corresponding region of the illumination target surface with the illumination light from one of the light emitting devices to form the image; and
a light condensing unit configured to collect the illumination light from each of the light emitting devices and to cause the illumination light to be incident on the illumination target surface, wherein
the light condensing unit includes a condenser lens array in which a plurality of condenser lens elements are aligned with each other,
the condenser lens elements are paired with the light emitting devices, respectively,
each of the condenser lens elements is provided with a light condensing surface to condense the illumination light,
a z-direction is defined as a direction in which surface vertexes of the light condensing surfaces are connected with the light emitting devices paired with the light condensing surfaces, respectively,
an x-direction and a y-direction are defined to be orthogonal to each other on a virtual plane orthogonal to the z-direction,
the pairs of the condenser lens elements and the light emitting devices are aligned in at least one of the x-direction and the y-direction as an alignment direction,
each of the light condensing surfaces is an anamorphic surface formed in a smooth convex shape in both the x-direction and the y-direction in which a curvature in the x-direction and a curvature in the y-direction are different from each other,
both of the x-direction and the y-direction are set as the alignment direction,
the illumination target surface is formed in a rectangular shape having a dimension Lx in a direction on the illumination target surface corresponding to the x-direction and a dimension Ly in a direction on the illumination target surface corresponding to the y-direction,
Nx number of pairs of the condenser lens elements and the light emitting devices are aligned in the x-direction, Ny number of pairs of the condensing lens elements and the light emitting devices are aligned in the y-direction,
Lx/Nx>Ly/Ny is satisfied, and
the curvature in the x-direction is smaller than the curvature in the y-direction;
the light condensing unit has an incident side surface that is opposed to the light emitting devices and on which the illumination light is incident, and
the incident side surface is a single plane having a smooth planar shape common to the respective condenser lens elements aligned in the alignment direction.

24. The head-up display device according to claim 23, wherein
the light condensing unit is integrally formed.

25. The head-up display device according to claim 24, wherein
each of the light condensing surfaces is convex in both a cross section taken along an axis along the x-direction and a cross section taken along an axis along the y-direction.

26. The head-up display device according to claim 23, wherein
the incident side surface of the light condensing unit is a proximal surface proximal to the light emitting devices and on which the illumination light is incident, and
the light condensing unit further including a distal surface.

* * * * *